(12) United States Patent
Yamaguchi et al.

(10) Patent No.: US 7,292,824 B2
(45) Date of Patent: Nov. 6, 2007

(54) COMMUNICATION CONTROL METHOD AND COMMUNICATION CONTROL SYSTEM

(75) Inventors: Koichiro Yamaguchi, Aichi-gun (JP); Yuji Aburakawa, Yokohama (JP); Yuji Nakayama, Yokohama (JP); Toru Otsu, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 717 days.

(21) Appl. No.: 10/378,893

(22) Filed: Mar. 5, 2003

(65) Prior Publication Data

US 2004/0203967 A1    Oct. 14, 2004

(30) Foreign Application Priority Data

Mar. 6, 2002    (JP)    ............... 2002-061119

(51) Int. Cl.
 H04B 1/10    (2006.01)
 H04B 15/00    (2006.01)
(52) U.S. Cl. .............. 455/63.1; 455/62; 455/452.2
(58) Field of Classification Search ............... 455/450, 455/452.1, 452.2, 464, 509, 510, 512, 517, 455/522, 63.1, 63.3, 448, 441, 437, 69, 412.2, 455/502, 520, 523, 524, 525, 67.11, 67.13, 455/62; 370/335, 465, 331
See application file for complete search history.

(56) References Cited

U.S. PATENT DOCUMENTS 6,351,643 B1 *    2/2002    Haartsen ................ 455/450
6,466,793 B1 *    10/2002    Wallstedt et al. .......... 455/450
6,563,810 B1 *    5/2003    Corazza ..................... 370/335
6,574,456 B2 *    6/2003    Hamabe ................... 455/63.3

FOREIGN PATENT DOCUMENTS

| EP | 0 946 072 | 9/1999 |
|---|---|---|
| JP | 5-206933 | 8/1993 |
| JP | 2000-13853 | 1/2000 |
| WO | WO 01/24568 | 4/2001 |

* cited by examiner

Primary Examiner—Edward F. Urban
Assistant Examiner—John J. Lee
(74) Attorney, Agent, or Firm—Oblon, Spivak, McClelland, Maier & Neustadt, P.C.

(57) ABSTRACT

A reception side radio station has a notification signal generator 108 which transmits a notification signal for notifying information of a frequency of a radio link being used at the radio station, and a transmitter 111 which transmits information indicating a reception power level and its frequency as radio signal data. On the other hand, a transmission side radio station has a notification signal measurer 106 which measures a reception power level of the notification signal and detects the frequency notified by the signal, and a frequency band controller 109 which determines an assignable frequency band for a radio link between the transmission side radio station and the reception side radio station based on the radio signal data and the notification signal.

18 Claims, 18 Drawing Sheets

COMMUNICATION CONTROL METHOD AND COMMUNICATION CONTROL SYSTEM

CROSS REFERENCE TO RELATED APPLICATIONS

This application is based upon and claims the benefit of priority from the prior Japanese Patent Application No. P2002-61119, filed on Mar. 6, 2002; the entire contents of which are incorporated herein by reference.

BACKGROUND OF THE INVENTION

1. Field of the Invention

The present invention relates to a communication control method and a communication control system assigning a usable frequency band when conducting radio communication between a transmission side base station and a reception side base station in a radio communication network in which a plurality of radio stations are deployed.

2. Description of the Related Art

Conventionally, a usable frequency band is assigned to a radio link when conducting communication between a transmission side base station and a reception side base station on a radio communication network in which a plurality of radio stations are deployed. FIG. 1 shows a conventional assignment method of a frequency band, In FIG. 1, radio stations 1 through 4 can be communicated with via radio links 12, 21, 13, 31, 34 and 43, For instance, if a new frequency band is assigned to a radio link 34 that is used from a transmission side radio station 3 to a reception side radio station 4, the frequency and reception power level transmitted by other radio stations are measured at an antenna of the reception side radio station 4, and the reception side radio station 4 then determines that frequencies whose reception power level is lower than a prescribed threshold are usable. As shown in FIG. 1(*c*), a frequency band that has no interference from other radio links is then assigned to the radio link 34 by selecting the frequency band from the frequencies that are determined as usable.

However, since interference that affects other radio links due to the assignment is not considered in the above conventional assignment method, interference that affects other radio links may occur due to the assignment of a frequency band to a radio link.

In other words, if a frequency band for the radio link 34 that is used from the transmission side radio station 3 to the reception side radio station 4 is assigned, as shown in FIG. 1(*d*), a frequency band that has no interference from the other radio links can be selected for the radio link 34 by measuring the frequency and reception power level received from the other radio stations at the antenna of the reception side radio station 4.

However, if the frequency band is assigned to the radio link 34 as shown in FIG. 1(*c*), great interference affecting the radio link 12 may occur in a case where the same frequency is simultaneously assigned to the radio link 34 and radio link 12 as shown in FIG. 1(*b*).

Therefore, not only interference from the other radio links but also interference that affects the other radio links should be considered in the assignment of a frequency band to a radio link. Otherwise, the reception power level of the interference may become greater at the other radio links and it may cause operational problems. However, recognition of the frequency bands and interference levels being used by all the radio links is difficult in the conventional assignment method.

BRIEF SUMMARY OF THE INVENTION

The present invention has been made in view of the above problems, and thus has an object of providing a communication control method and a communication control system, which are capable of the effective use of a frequency band by detecting frequencies that may interfere with radio links being used, i.e., radio links being received, at other radio stations, and dynamically assigning a frequency band that prevents interference to a radio link when radio communication is conducted between the transmission side radio station and a reception side radio station in a radio network in which a plurality of the radio stations are deployed.

To achieve the object, when communication is conducted between a transmission side radio station and a reception side radio station in a radio network in which a plurality of the radio stations are deployed, each radio station transmits a notification signal that notifies information of the frequency of a radio link being used at the radio station. Then the reception side radio station measures the reception power level of the radio signal received and detects the frequency of the radio signal, and transmits the reception power level and the frequency of the radio signal to the transmission side radio station as radio signal data. Further, the transmission side radio station measures the reception power level of each of the notification signals and detects the frequency of the radio link being used at each of the radio stations, which is notified by the notification signal, and determines an assignable frequency band to be used between the transmission side radio station and the reception side radio station at the transmission side radio station based on information contained in the radio signal, the reception power level of the notification signal and information contained in the notification signal.

According to the present invention, each of the radio stations notify frequency bands being used at the radio station to other radio stations by transmitting the notification signal. The reception side radio station then measures the reception power level of the radio signal and transmits the measured result to the transmission side radio station as the radio signal data. The transmission side radio station can therefore select a frequency band, of which the reception level at the other radio stations is below a prescribed threshold. Further, since the reception level of the notification signal is measured and the information regarding frequency bands contained in the notification signal is detected, a frequency band that can minimize interference to the other radio links can therefore be selected so as to assign frequencies effectively.

In the above described invention, it is preferred that the radio link is configured with a traffic frequency band that is used for transmission of information signal, and a frequency band for control that is used as a control signal, the frequency of the radio link being used at the radio station is located in the traffic frequency band, and the notification signal is transmitted using the frequency band for control.

In the above described invention, it is also preferred that a frequency of the traffic frequency band correlates with a frequency of the frequency band for control, and each of the radio stations detects the frequency of the notification signal in the frequency band for control so as to recognize the frequency being used in the traffic frequency band at the radio station that transmits the notification signal.

In this case, since the reception information of the traffic frequency band is notified using the frequency band for control, interference between the radio signal that carries the information signal and the notification signal is avoided.

In the above described invention, it is preferred that each of the radio stations modulates the notification signal that contains information of the frequency being used in the traffic frequency band and transmits the modulated notification signal, and other radio stations demodulate the modulated notification signal so as to acquire the information of the frequency being used in the traffic frequency band.

In this case, since the modulated notification signal that contains information regarding frequency bands is transmitted and the notification signal is demodulated at a radio station that sets a radio link, the information regarding the frequency bands can be effectively notified to the radio station.

In the above described invention, it is preferred that each of the radio stations transmits the notification signal at a random interval within a prescribed time range.

In this case, since the transmission timing of the notification signal differs from the other radio stations, the reception timing of the notification signals at a radio station that sets a radio link can also differ so as to recognize a level of interference that may affect respective radio links more accurately.

In the above described invention, it is preferred that each of the radio stations measures the carrier to interference ratio of the radio link being used and transmits the notification signal with a power level that corresponds to the measured carrier to interference ratio.

In this case, since the notification signal is transmitted with the transmission power level that corresponds to the carrier to interference ratio of the radio link being used, assigning a frequency band that may interfere with the radio link due to a smaller carrier to interference ratio can be avoided.

In the above described invention, it is preferred that each of the radio stations modulates the notification signal that contains the measured carrier to interference ratio and transmits the modulated notification signal, and other radio stations demodulate the modulated notification signal so as to acquire the measured carrier to interference ratio.

In this case, since the modulated notification signal that contains information regarding the frequency and the carrier to interference ratio of the radio link being used is transmitted, a frequency band, which prevents the carrier to interference ratio of the radio link from being degraded below a prescribed threshold, can be assigned.

In the above described invention, it is preferred that the transmission side radio station determines a transmission rate based on the volume of data to be transmitted and assigns a required frequency bandwidth to transmit the data by the determined transmission rate.

In this case, in addition to the prevention of interference caused by a radio station which may affect the other radio links, and interference from the other radio stations which may affect the radio station, a frequency band is assigned to a radio link according to the volume of data to be transmitted so as to transmit the data with a prescribed transmission rate.

In the above described invention, it is preferred that priority is given to a lower or higher frequency in the assignable frequency band when a frequency is assigned to the radio link at the transmission side radio station.

In this case, since a lower or higher frequency band is assigned appropriately to a radio link, the frequency band can be used more effectively.

In the above described invention, it is preferred that the transmission side radio station assigns frequency bands that are contiguously located or a plurality of frequency bands in the traffic frequency band to radio links.

In this case, a frequency band can be assigned more appropriately, and thus optimum communication, depending on each radio station's needs, can be achieved.

DETAILED DESCRIPTION OF THE INVENTION

FIRST EMBODIMENT (Overview of Communication Control Method)

Figure 1:
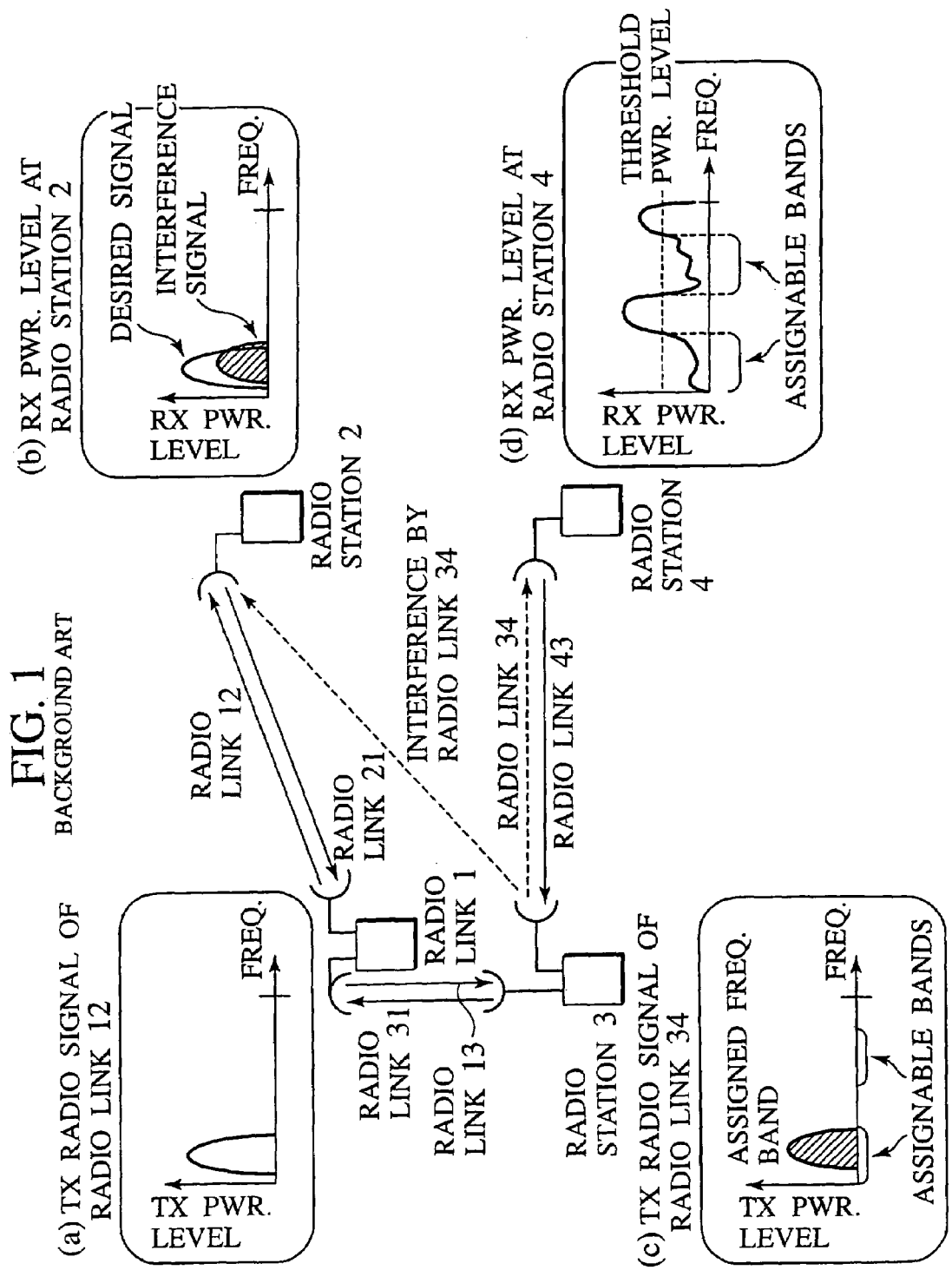
FIG. 1 is diagram showing a conventional frequency assignment method.
Figure 2:
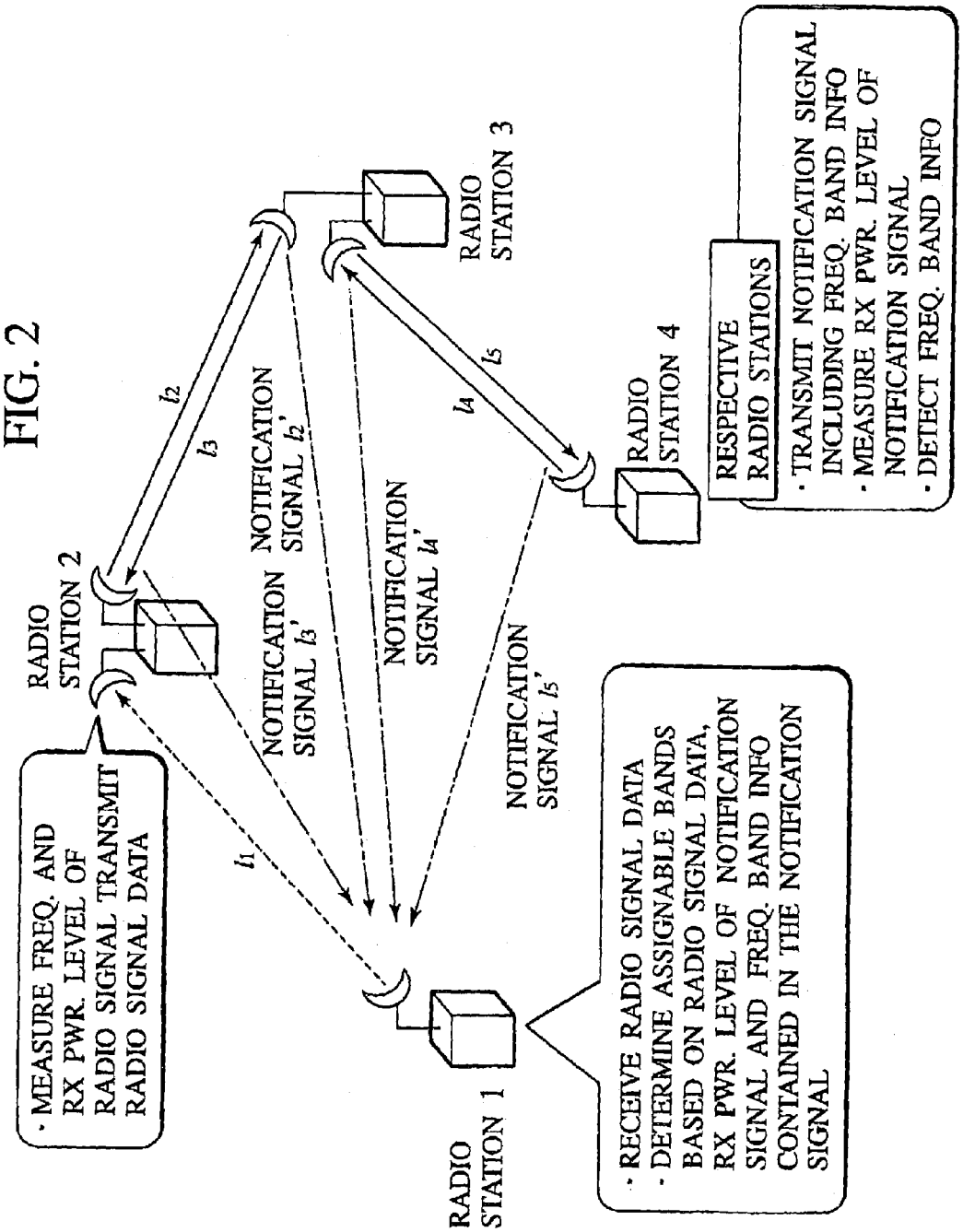
FIG. 2 is a schematic diagram showing the overall configuration of a communication control system according to the first embodiment.

Hereinafter, a communication control system according to the first embodiment will be described. FIG. 2 is a schematic diagram showing the overall configuration of a communication control system according to this embodiment. In FIG. 2, $1_1$ through $1_5$ indicate radio links. Accordingly, radio stations 2 through 4 are interconnected by the radio links and the radio stations 2 through 4 transmit a notification signal that contains information regarding frequency band of radio links received at the radio station.

The radio station 2 measures the frequency and reception power level of the radio signal received at a reception antenna when a new frequency band is assigned to the radio link $1_1$ and transmits the measured information to a transmission side radio station 1 as radio signal data. The transmission side radio station 1 receives the radio signal data and acquires the reception power level of the notification signals transmitted by the respective radio stations and the information regarding frequency band contained in the notification signals.

The transmission side radio station 1 can therefore recognize the frequency bands being used at other radio links and the interference that may affect the other radio links. For instance, interference whereby the radio link $1_1$ may affect the radio link $1_4$ can be recognized based on the reception power level of a notification signal $1_4$, that is transmitted by the radio station 3, and the frequency band information of the radio link $1_4$ can be acquired based on notification signal $1_4$. Further, the transmission side radio station 1 can recognize a level of interference whereby the other radio links may affect the radio station 2 based on the radio signal data transmitted by the radio station 2.

The transmission side radio station 1 can therefore determine a usable (assignable) frequency band according to the information acquired from the respective radio stations and the radio signal data transmitted by the radio station 2, both of which allow the estimation of interferences that may affect the other radio links.

Figure 3:
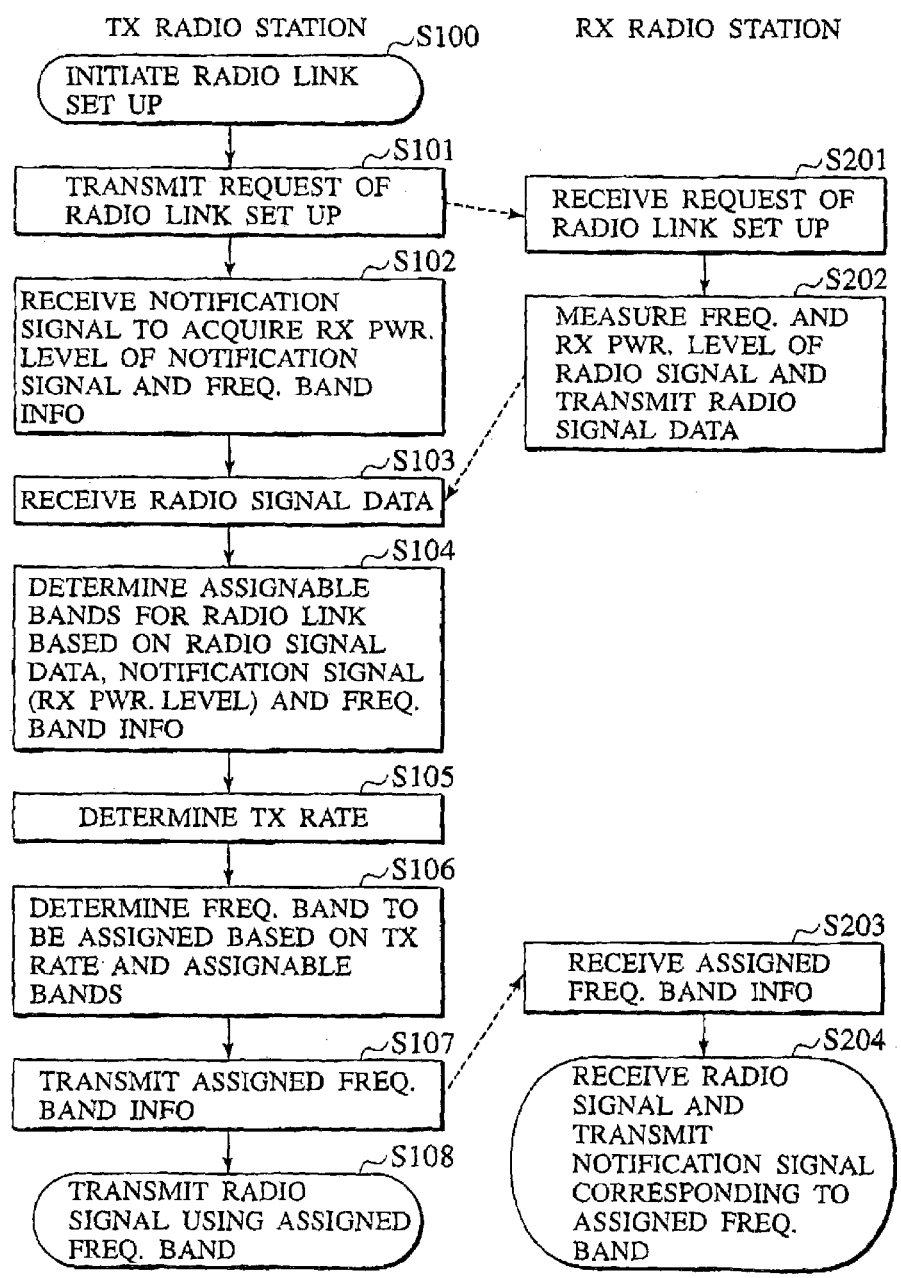
FIG. 3 is flowchart showing a frequency assignment method according to the first embodiment.

FIG. 3 is a flowchart showing an assignment process of a frequency band according to this embodiment.

As shown in FIG. 3, the radio station 1 first initiates a radio link set up process (S100), Then an assignment request for a frequency band to a radio link arises, and the transmission side radio station 1 transmits the request to the radio station 2 (S102). The radio station 2 receives the request (S201). The radio station 2 then measures the frequency of the radio signal and its reception power level on the traffic frequency band and transmits the measured frequency and the reception power level of the radio signal to the transmission side radio station 1 as the radio signal data (S202).

On the other hand, the transmission side radio station 1 acquires the reception is power level of the notification signals that are transmitted by the other radio stations, and the information regarding the frequency band contained in the notification signal (S102). The transmission side radio station 1 then receives the radio signal data from the radio station 2 (S103). Further, the transmission side radio station 1 determines an assignable frequency band on the traffic frequency band based on the radio signal data, the reception power level of the notification signal and the information regarding the frequency band (S104).

Moreover, the transmission side radio station 1 determines the transmission rate of the radio link to be set (S105), and selects a frequency band to be assigned to the radio link within the assignable frequency bands (S106). The transmission side radio station 1 then transmits information indicating the selected frequency band to the radio station 2 (S107). Finally, the transmission side radio station 1 transmits a radio signal using the selected frequency band (S108). The radio station 2 receives the information indicating the selected frequency band (S203). The radio station 2 then receives the radio signal from the transmission side radio station 1 and transmits a notification signal regarding the selected frequency band to the other radio stations (S204).

(Configuration of Notification Signal)

Figure 4:
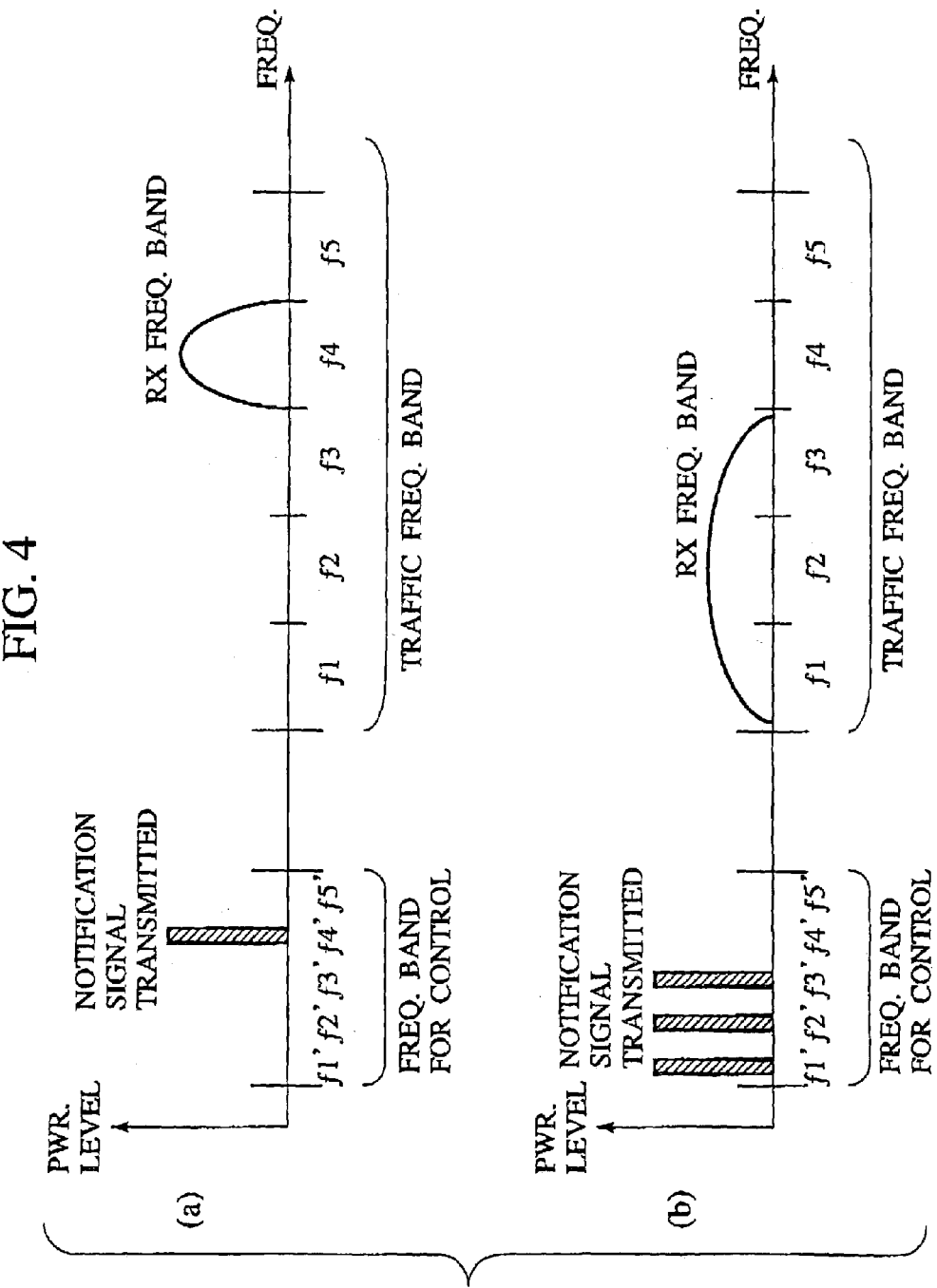
FIG. 4 is a schematic diagram showing a notification signal according to the first embodiment.

Hereinafter, configuration of the notification signal will be described. FIG. 4 is a schematic diagram showing the configuration of the notification signal according to this embodiment. As shown in FIG. 4, the traffic frequency band and frequency band for control are assigned to the radio links $1_1$ through $1_5$. The radio stations 1through 4 determine a frequency band for the notification signal that is transmitted by the frequency band for control according to the frequency band of a radio signal received on the traffic frequency band.

For instance, as shown in FIG. 4(a), $f_1$ through $f_5$ are set on the traffic frequency band and $f_{1'}$ through $f_{5'}$ are set on the frequency band for control, which correlates with $f_1$ through $f_5$, respectively. If $f_4$ is used on the traffic frequency band, the notification signal is continuously transmitted using $f_{4'}$. Further, if $f_1$, $f_2$ and $f_3$ are used on the traffic frequency band, the notification signals are continuously transmitted using $f_{1'}$, $f_{2'}$ and $f_{3'}$.

Figure 5:
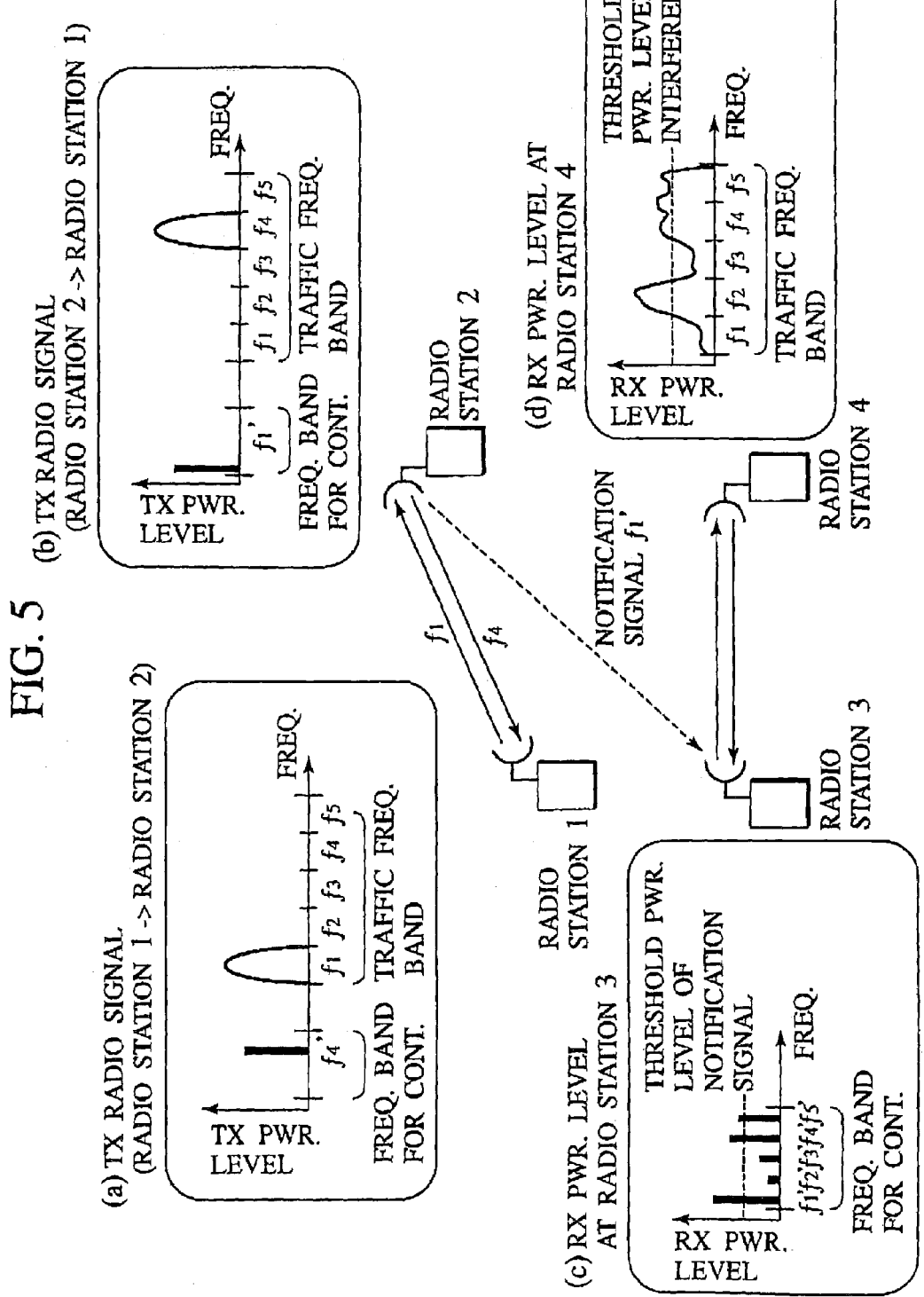
FIG. 5 is a schematic diagram showing the transmission and reception processes of the notification signal according to the first embodiment.

The above described notification signal is transmitted as shown in FIG. 5. FIG. 5 is a schematic diagram showing the transmission and reception processes of the notification signal according to this embodiment. In FIG. 5, $f_1$ through $f_5$ indicate a traffic frequency band, and $f_{1'}$ through $f_{5'}$ indicate frequencies on the frequency band for control, which correlate with $f_1$ through $f_5$, respectively. In FIG. 5, bi-directional communication is being performed between the radio station 1 and radio station 2. As shown in FIGS. 5(a) and (b), the radio stations 1 through 4 transmit the radio signal via the traffic frequency band and the notification signal via the frequency band for control, respectively.

Here, in a case where a radio link from the radio station 3 to the radio station 4 is set, the radio station 4 measures the reception power level of radio signals on the traffic frequency band as shown in FIG. 5(d), and the radio station 3 measures the reception power level of notification signals on the frequency band for control as shown in FIG. 5(c). For instance, as shown in FIG. 5(c), $f_{1'}$ that is transmitted by the radio station 2 has a greater reception power level than others at the radio station 3, and the radio station 3 recognizes that the radio link being set from the radio station 3 to the radio station 4 may adversely affect the radio station 2 if $f_1$ is assigned to the radio link.

Accordingly, since the reception power level of interference at the radio station 4 is below the threshold and the reception power level of the notification signal at the radio station 3 is below the threshold, the radio station 3 determines that $f_3$ is an assignable frequency band for the radio link from the radio station 3 to the radio station 4.

(Configuration of Communication Control System)

Figure 6:
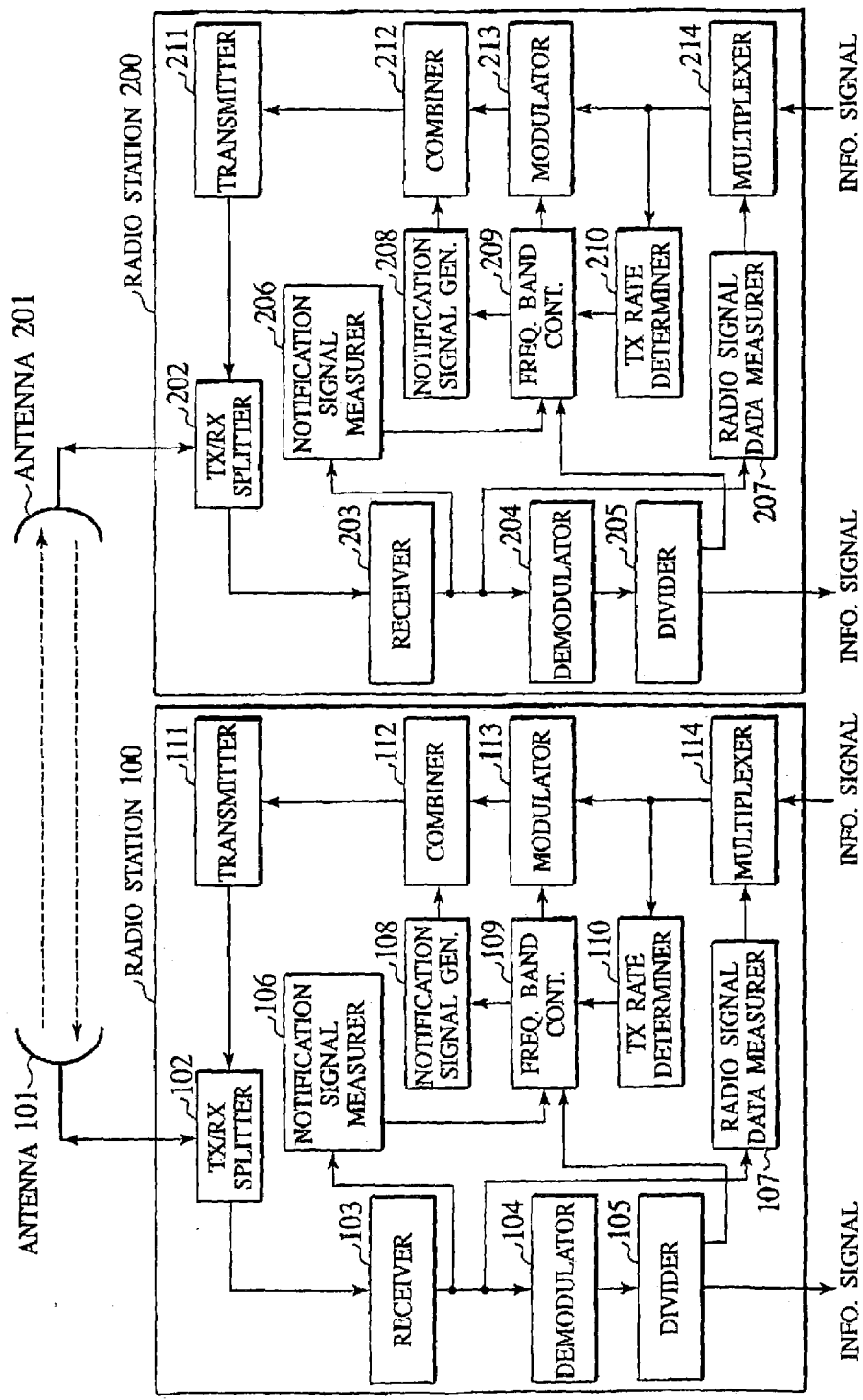
FIG. 6 is a block diagram showing radio stations according to the first embodiment.

Hereinafter, internal configuration of the radio station performing the above described communication control method will be described. FIG. 6 is a block diagram showing the radio station according to this embodiment. As shown in FIG. 6, a radio station 100 and a radio station 200 have a TX/RX splitters 102, 202 which splits signals transmitted and received by antennas 101, 201, receivers 103, 203 which receive the split signal, demodulators 104, 204 which demodulate the received signal, dividers 105, 205 which divide the demodulated signal, notification signal measurers 106, 206 which measure the reception power level of the notification signal, and radio signal measurers 107, 207 which measure the reception power level of the radio signal data, respectively.

Further, the radio station 100 and radio station 200 have multiplexers 114, 214 which multiplex a information signal and the radio signal data, TX rate determiners 110, 210 which determine a transmission rate depending on the multiplexed data, frequency band controllers 109, 209 which control the frequency band to be used, modulators 113, 213 which modulate the signal to be transmitted, notification signal generators 108, 208 which generate the notification signal based on the determined frequency band, combiners 112, 212 which combine the notification signal and the modulated signal, and transmitters 111, 211 which transmit the combined signal, respectively.

It is to be noted that in the embodiments, the radio signal data measurer 107 acts as the radio signal data transmitter, the notification signal generator 108 acts as the notification signal transmitter, and the frequency band controller 109 acts as the frequency band determiner as well as the frequency band controller, respectively.

Firstly, a reception process at the radio station 100 will be described. The radio station 100 receives the radio signal from the radio station 200 via the antenna 101, and the receiver 103 receives the radio signal through the TX/RX splitter 102. The demodulator 104 demodulates the received signal and forwards the signal to the divider 105. Since the signal demodulated by the demodulator 104 is configured with the information signal transmitted from the radio station 200 to the radio station 100 and a control signal that contains information regarding the radio signal received at the antenna 201 of the radio station 200, the signal is forwarded to the divider 105 so as to divide the signal into the information signal and the control signal. The control signal is then forwarded to the frequency band controller 109.

Further, the radio signal data measurer 107 measures the frequency and the reception power level of the radio signal received at the antenna 101, The notification signal measurer 106 measures the reception power level of the notification signal on the frequency band for control, which is received at the antenna 101, and forwards the measured data that indicates the reception power level to the frequency band controller 109.

Next, a transmission process of the radio station 100 will be described. The multiplexer 114 multiplexes the information regarding the reception power level of the radio signal that is measured by the radio signal data measurer 107 and the information signal. The multiplexer 114 forwards the multiplexed signal to the TX rate determiner 110 and the modulator 113. The TX rate determiner 110 determines the transmission rate of the radio link to be set and forwards the determined rate to the frequency band controller 109.

The frequency band controller 109 controls a frequency band of the transmission radio link based on the information of the radio signal received at the radio station 200, the information of the notification signal measured at the notification signal measurer 106 and the transmission rate determined by the TX rate determiner 110. The modulator 113 then modulates the multiplexed signal to a radio signal according to the control of the frequency band controller 109 and forwards the modulated signal to the combiner 112.

Further, the frequency band controller 109 forwards the information regarding the frequency band assigned to the radio link from the radio station 200 to the radio station 100, to the notification signal generator 108. The notification signal generator 108 generates the notification signal corresponding to the frequency band of the radio link and forwards the notification signal to the combiner 112. The combiner 112 combines the radio signal forwarded by the modulator 113 and the notification signal forwarded by the notification signal generator 108, and forwards the combined signal to the transmitter 111. The combined signal is then transmitted by the antenna 101 through the TX/RX splitter 102.

SECOND EMBODIMENT

Figure 7:
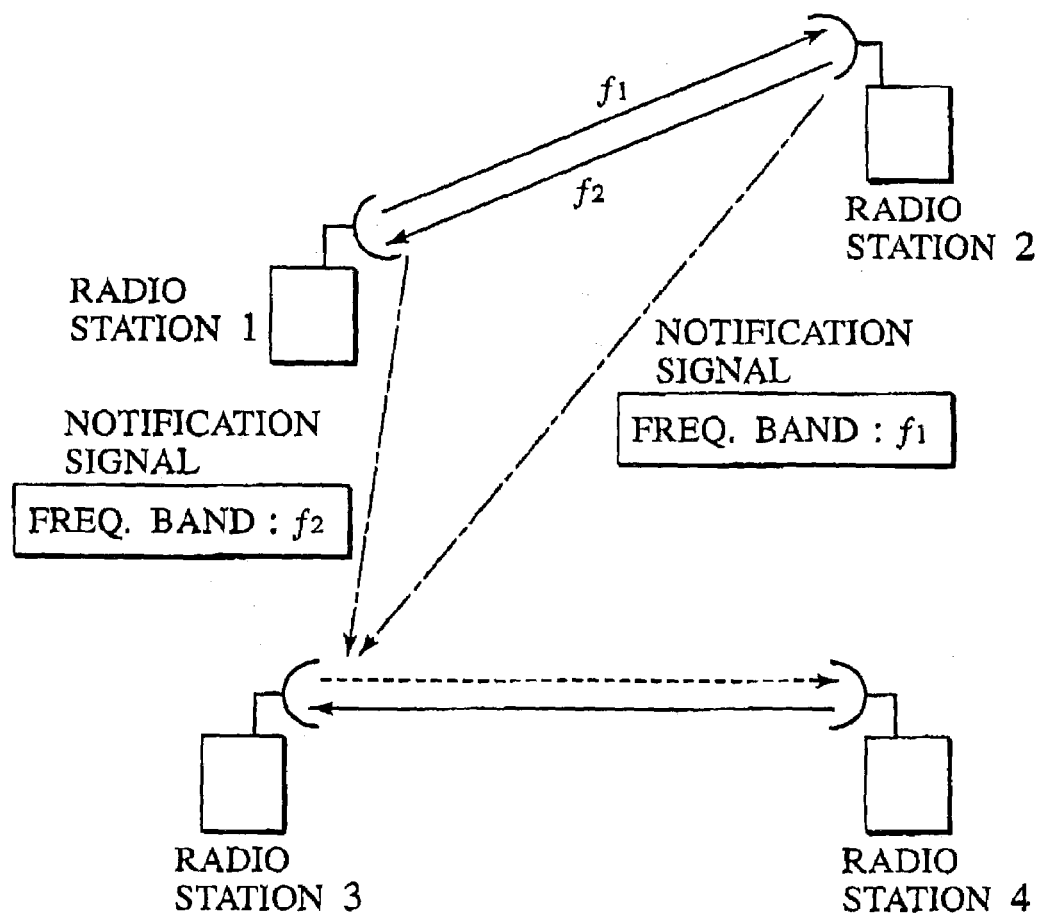
FIG. 7 is a schematic diagram showing an overview of a communication control system according to the second embodiment.

Hereinafter, the second embodiment of the present invention will be described. FIG. 7 is a schematic diagram showing an overview of a communication control system according to this embodiment. In FIG. 7, $f_1$ and $f_2$ indicate a frequency band on the traffic frequency band. The frequency bands are assigned to the radio links whereby bi-directional communication is being performed between the radio station 1 and the radio station 2.

As shown in FIG. 7, the radio station 1 and the radio station 2 transmit the notification signal that contains information regarding the frequency band of the received radio link, respectively. The radio station 3 can therefore recognize the frequency bands being used at the radio stations 1, 2, and 4 by receiving the notification signals. Thus, the radio station 3 can determine a frequency band, which will not interfere with the radio link between the radio station 1 and the radio station 2.

Especially, in this embodiment, each radio station (i.e., radio stations 1 through 4) modulates the information regarding the frequency band of the received radio link and transmits the modulated notification signal. The other radio stations demodulate the modulated notification signal so as to acquire the information contained in the notification signal.

Figure 8:
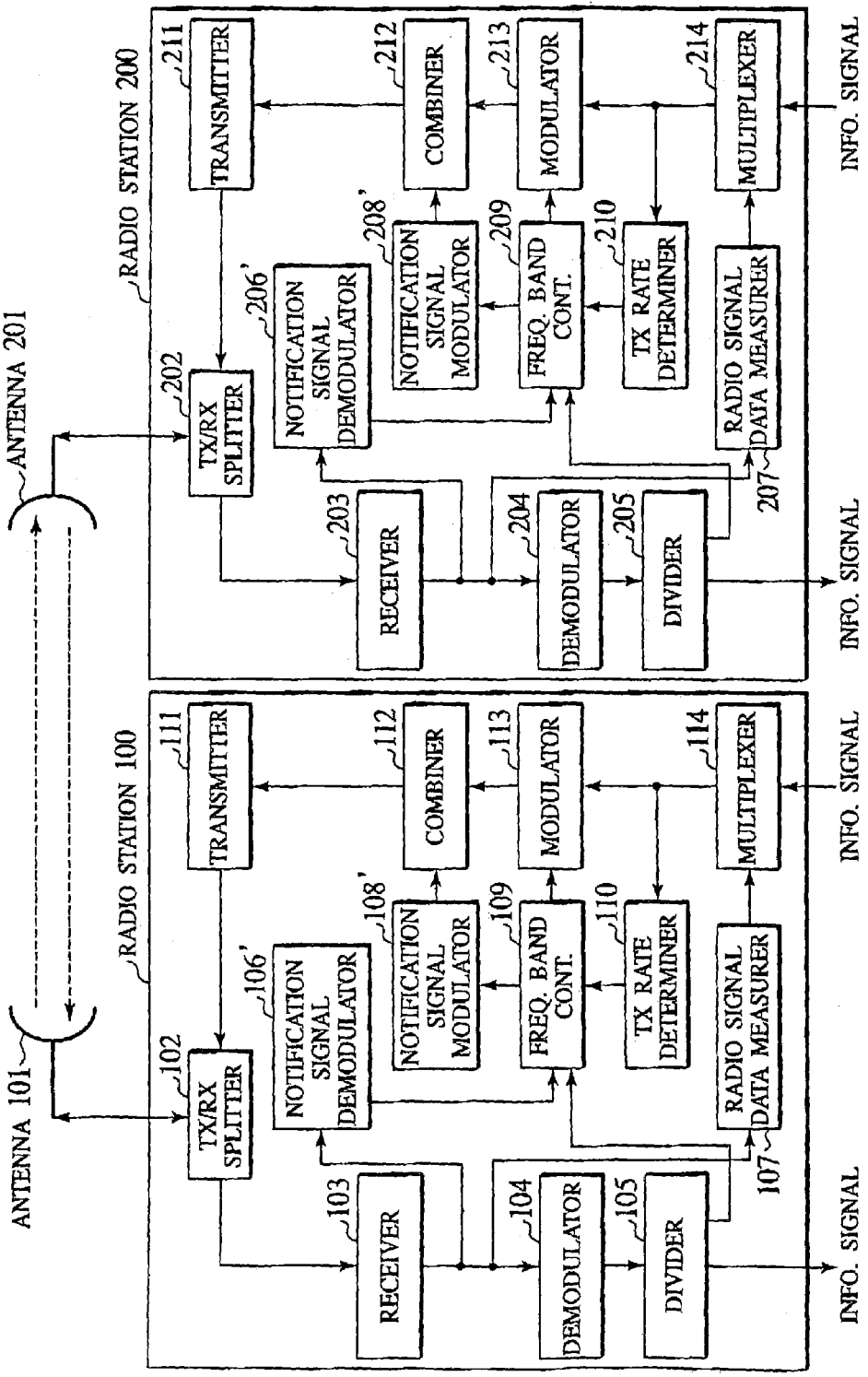
FIG. 8 is a block diagram showing radio stations according to the second embodiment.

FIG. 8 is a block diagram showing radio stations according to this embodiment. In order to accomplish the above-described feature, the radio station in the communication control system-according to this embodiment has a notification signal demodulator 106', 107' instead of the notification signal measurers 106, 107 and a notification signal modulator 108', 208' instead of the notification signal generator 108, 208 as shown in FIG. 8.

The radio station 100 receives the radio signal from the radio station 200 via the antenna 101, and the receiver 103 receives the radio signal through the TX/RX splitter 102. The demodulator 104 demodulates the received signal and forwards the signal to the divider 105. The divider 105 divides the signal into the information signal and the control signal. The control signal is then forwarded to the frequency band controller 109.

Further, the radio signal data measurer 107 measures the frequency and the reception power level of the radio signal. The notification signal demodulator 106' demodulates the notification signal, which is received at the antenna 101. Further, the notification signal demodulator 106' acquires information regarding the received frequency band based on the notification signal and measures the reception power level of the notification signal. The information acquired from the notification signal and the measured reception power level are then forwarded to the frequency band controller 109.

On the other hand, the multiplexer 114 multiplexes the information regarding the reception power level of the radio signal that is measured by the radio signal data measurer 107 and the information signal. The multiplexer 114 forwards the multiplexed signal to the TX rate determiner 110 and the modulator 113. The TX rate determiner 110 determines the transmission rate of the radio link to be set and forwards the determined rate to the frequency band controller 109.

The frequency band controller 109 controls a frequency band of the transmission radio link based on the information of the radio signal received at the radio station 200, the information of the notification signal measured at the notification signal demodulator 106' and the transmission rate determined by the TX rate determiner 110. The modulator 113 then modulates the multiplexed signal to a radio signal according to the control of the frequency band controller 109 and forwards the modulated signal to the combiner 112.

Further, the frequency band controller 109 forwards the information of the frequency band assigned to the radio link from the radio station 200 to the radio station 100 to the notification signal modulator 108'. The notification signal modulator 108' modulates the information regarding the frequency band of the radio link and forwards the notification signal to the combiner 112. The combiner 112 combines the radio signal forwarded by the modulator 113 and the notification signal forwarded by the notification signal modulator 108', and forwards the combined signal to the transmitter 111. The combined signal is then transmitted by the antenna 101 through the TX/RX splitter 102. It is to be noted that the same process is also performed in the radio station 200.

THIRD EMBODIMENT

Figure 9:
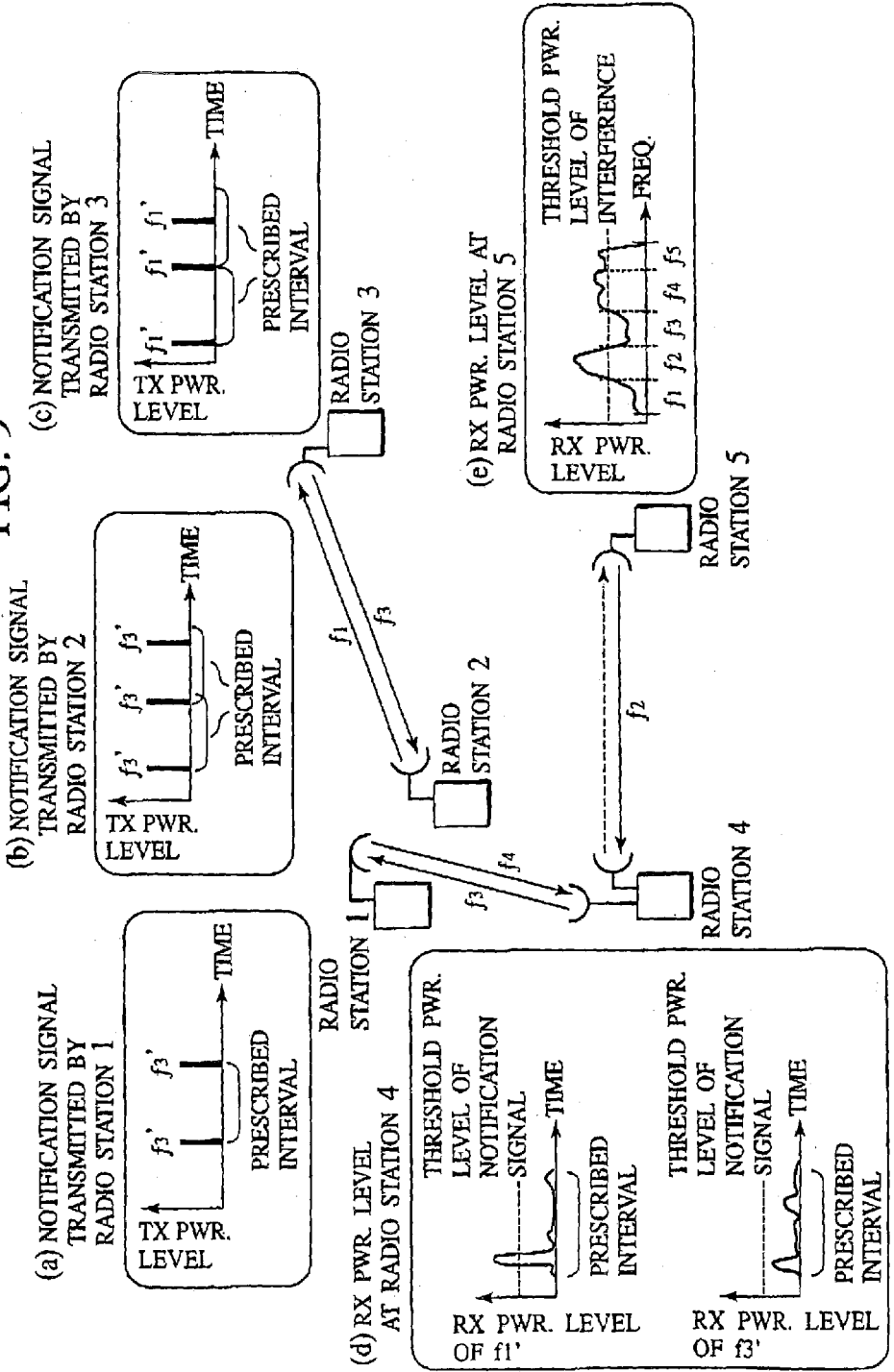
FIG. 9 is a schematic diagram showing a process of a communication control system according to the third embodiment.

FIG. 9 is a schematic diagram showing a process of a communication control system according to the third embodiment. In FIG. 9, $f_1$ through $f_5$ show a frequency band on the traffic frequency band, and $f_{1'}$ through $f_{5'}$ show a frequency on the frequency band for control, which correlates with $f_1$ through $f_5$. Further, the frequency bands are assigned to radio links whereby bi-directional communications are being performed between the radio station 1 and the radio station 4, and between radio station 2 and the radio station 3, respectively.

The radio stations 1, 2, and 3 continually transmit the notification signal that correlates with the received frequency band with a certain interval as shown in FIGS. 9(a), (b) and (c). Each radio station may randomly determine transmission timing of the notification signal within a certain period of time. For instance, if a frequency band for a radio link from the radio station 4 to the radio station 5 is assigned, the radio station 5 measures the reception power level of the received radio signals as shown in FIG. 9(e), and the radio station 4 measures the reception power level of the notification signal for the certain period of time as shown in FIG. 9(d).

The radio station 4 determines that a frequency band is assignable, if its reception power level is less than a prescribed threshold during the certain period of time at the radio station 5 and the reception level of its notification signal does not exceed a prescribed threshold during the certain period of time at the radio station 4. That is, as shown in FIGS. 9(d) and (e), the radio station 4 determines a frequency band within $f_1$ and $f_3$, in both of which, the reception power level of the radio signal is less than the prescribed threshold, Further, since the reception power level of $f_{3'}$ (notification signal) does not exceed the prescribed threshold during the certain period of time whereas, the reception power level of $f_{1'}$ (notification signal) exceeds the threshold, the radio station 4 determines $f_3$, which correlates with $f_{3'}$, as the assignable frequency band for the radio link.

As described heretofore, since each radio station randomly determines the transmission timing of the notification signal and continually transmits the signal, it is feasible to distinguish the frequency band, whose reception power level of the notification signal exceeds the prescribed threshold at the transmission timing during the certain period of time, from the frequency bands for which the notification signal is transmitted. Thus, the magnitude of interference caused by the radio link assignment can be examined more accurately.

(Modification)

Figure 10:
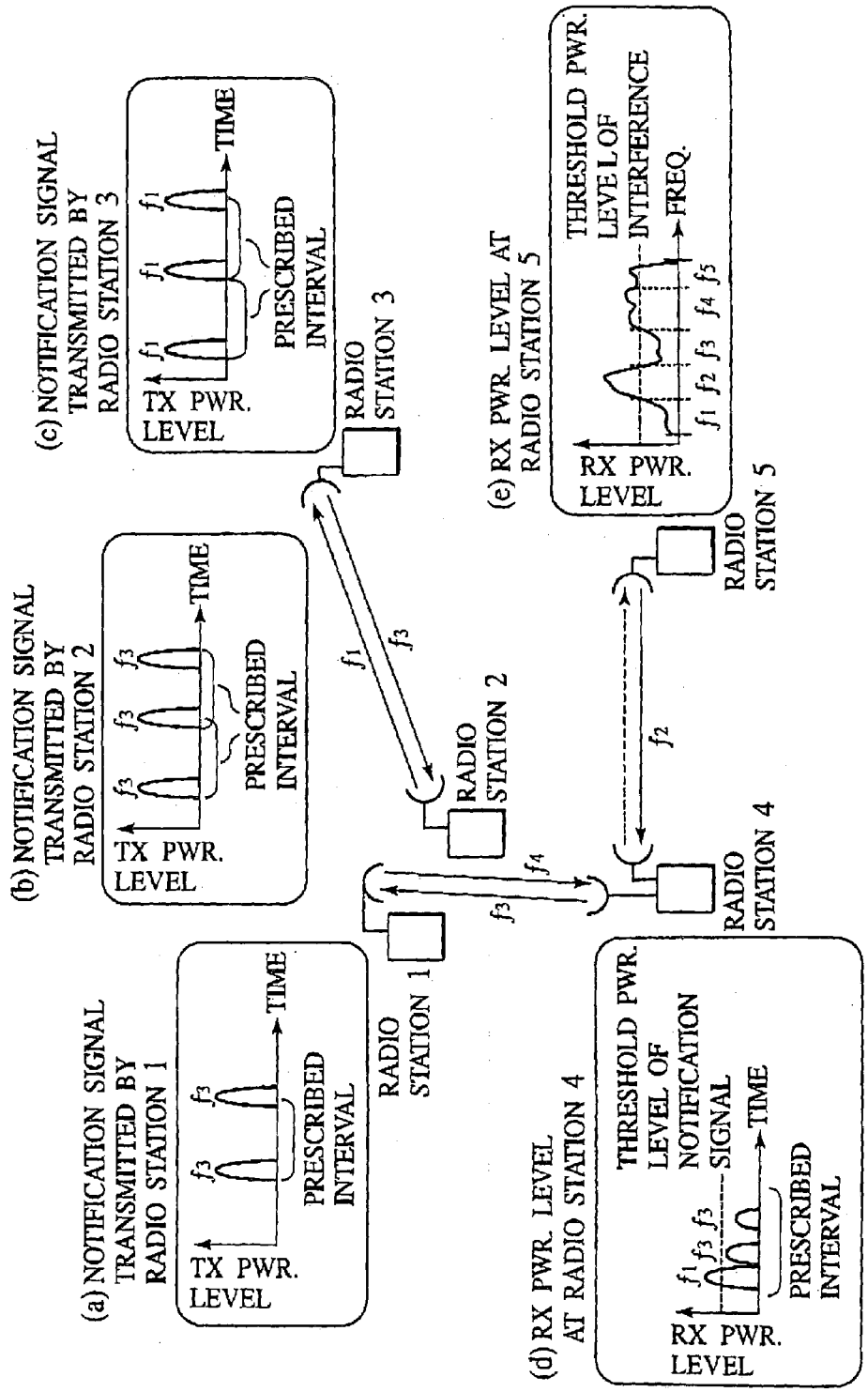
FIG. 10 is a schematic diagram showing a process of a communication control system according to a modification of the third embodiment.

FIG. 10 is a schematic diagram showing a process of the communication control system according to modification of the third embodiment. In FIG. 10, $f_1$ through $f_5$ show a frequency band on the traffic frequency band. Further, the frequency bands are assigned to radio links whereby bi-directional communications are being performed between the radio station 1 and the radio station 4, and between radio station 2 and the radio station 3, respectively.

In this modification, the radio stations 1, 2, and 3 continually transmit the modulated signal that contains information regarding the received frequency bands as the notification signal with a certain interval as well as transmission power level as shown in FIGS. 10(a), (b) and (c). Each radio station may randomly determine the transmission timing of the notification signal within a certain period of time. For instance, if a frequency band for a radio link from the radio station 4 to the radio station 5 is assigned, the radio station 5 measures the reception power level of received radio signals as shown in FIG. 10(e), and the radio station 4 measures the reception power level of the notification signal for the certain period of time as shown in FIG. 10(d).

The radio station 4 determines that a frequency band is assignable, if its reception power level is less than a prescribed threshold during the certain period of time at the radio station 5 and the reception level of its modulated notification signal does not exceed a prescribed threshold during the certain period of time at the radio station 4, As shown in FIGS. 10(d) and (e), the radio station 4 determines a frequency band within $f_1$ and $f_3$, in both of which, the reception power level of the radio signal is less than the prescribed threshold. Further, since the reception power level of the notification signal transmitted by the radio station 3 exceeds the threshold at the radio station 4 and $f_1$ can be retrieved from the notification signal, the radio station 4 determines $f_3$, which does not exceed the threshold as the assignable frequency band for the radio link. Thus, it is feasible to select a frequency band, in which the magnitude of interference caused by the other radio links is less than the prescribed threshold, and which may not greatly interfere with the other radio links.

FOURTH EMBODIMENT

Figure 11:
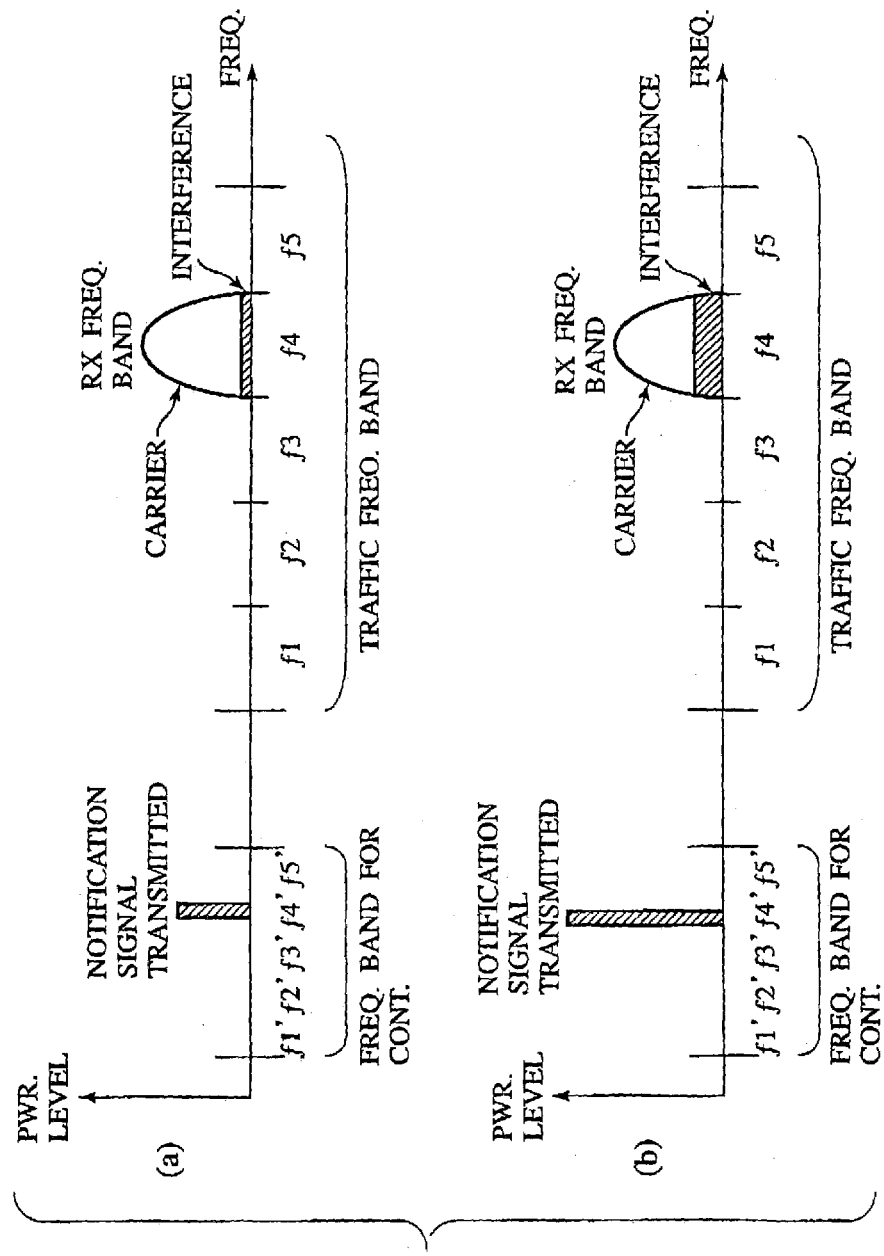
FIG. 11 is a schematic diagram showing a communication control method according to the fourth embodiment.

FIG. 11 is a schematic diagram showing a communication control method according to this embodiment. In this embodiment, a transmission side radio station determines the transmission power level of the notification signal that is transmitted by the frequency band for control based on a carrier to interference ratio (hereinafter referred to as CIR).

That is, as shown in FIGS. 11(a) and (b), the transmission power level is set according to the CIR. The notification signal is transmitted with the transmission power $P_{ctb}$, which is calculated by the following formula.

$$P_{ctb} = \frac{CIR_l}{CIR_l - CIR_{req}} \cdot P_{tb}$$

Here, $CIR_l$ means a CIR of a radio link, $CIR_{req}$ means a required CIR for communication, and $P_{tb}$ means a base transmission power level. Further, an upper limit is set for $P_{ctb}$ so as to limit the level.

Figure 12:
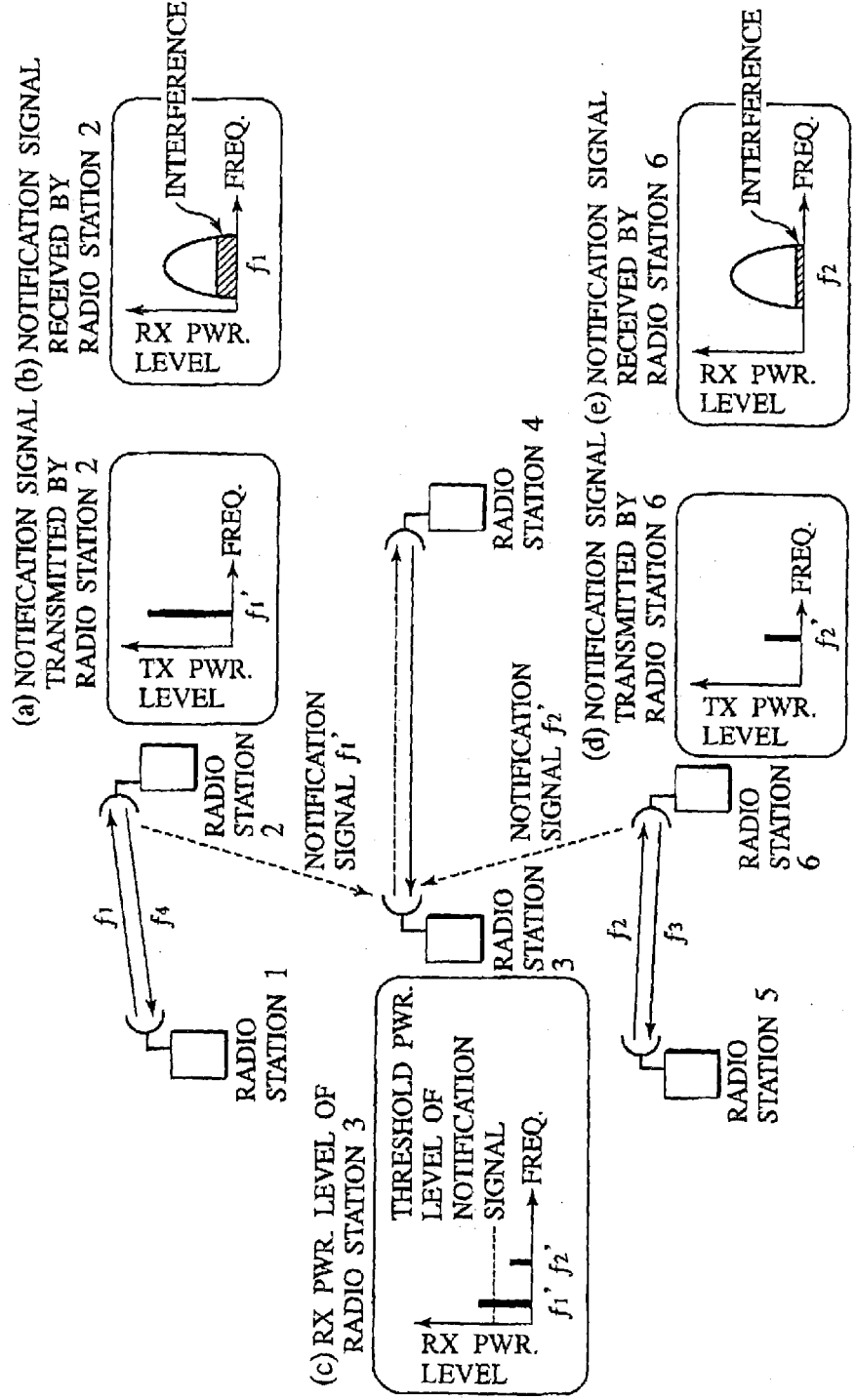
FIG. 12 is a schematic diagram showing a process of a communication control system according to the fourth embodiment.

FIG. 12 is a schematic diagram showing a process of a communication control system according to this embodiment. In FIG. 12, $f_1$ through $f_4$ indicate a frequency band on the traffic frequency band. Further, the frequency bands are assigned to radio links whereby bi-directional communications are being performed between the radio station 1 and the radio station 2, and between the radio station 5 and the radio station 6, respectively.

Since the radio stations 2 and 6 are interfered with on the reception frequency band as shown in FIGS. 12(b) and (e), the radio stations set the transmission power level of the notification signal according to the CIR as shown in FIGS. 12(a) and (d). Then the radio station 3 measures the reception power level of the notification signal. As a result, since the radio station 2 that has a smaller value of CIR, the reception power level of $f_{1'}$ is greater than $f_{2'}$ at the radio station 3. Therefore, $f_1$ that correlates with $f_{1'}$ is not assigned to a radio link. This method can prevent a frequency band which may interfere with the radio link that has already been interfered with from being selected.

Figure 13:
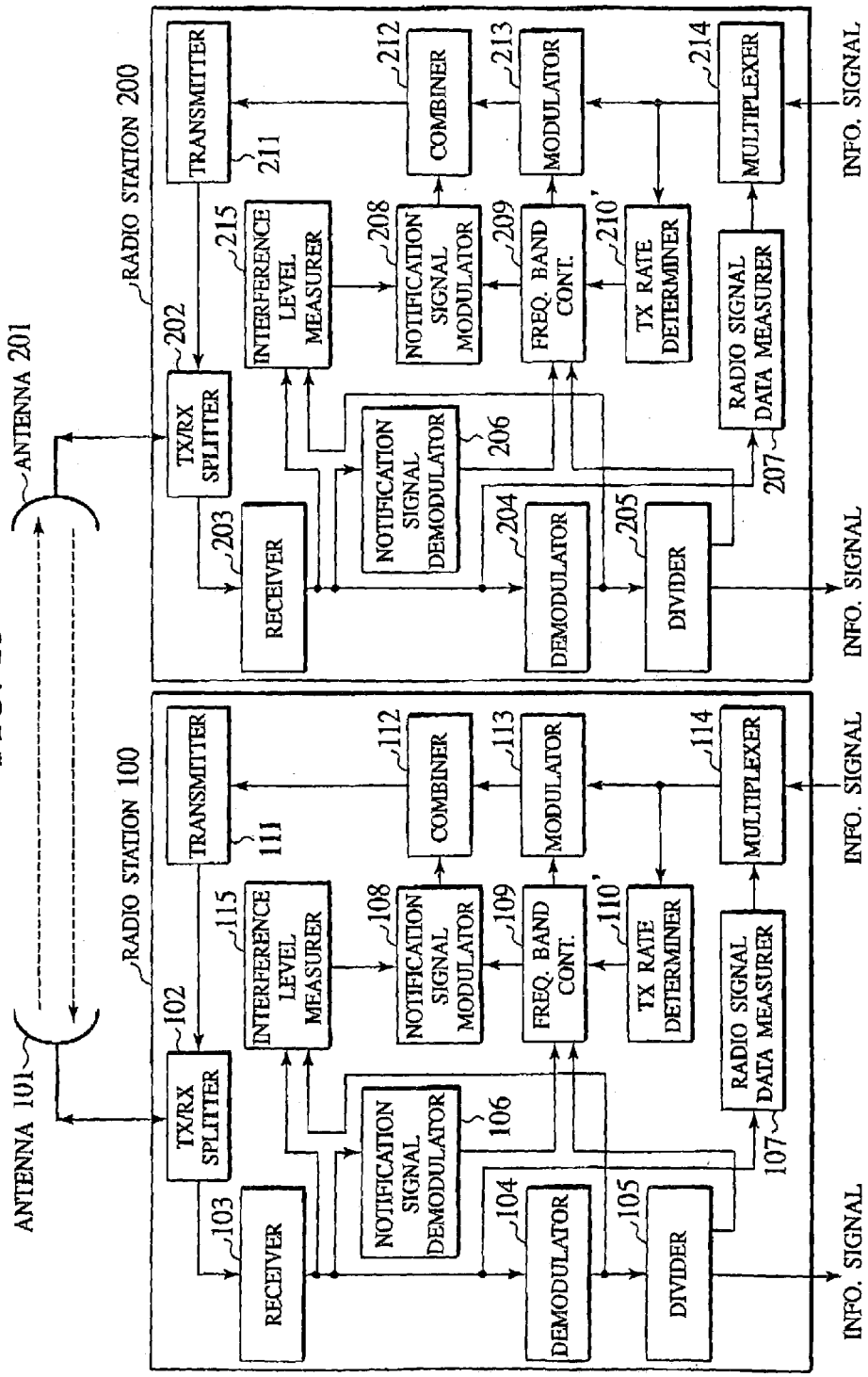
FIG. 13 is a block diagram showing radio stations according to the fourth embodiment.

FIG. 13 is a block diagram showing radio stations according to this embodiment. In this embodiment, CIR calculators 115, 215, which calculate the CIR of a received signal, are added to the radio station 100 and radio station 200, which are described in the first embodiment.

The radio station 100 receives the radio signal from the radio station 200 via the antenna 101, and the receiver 103 receives the radio signal through the TX/RX splitter 102. The demodulator 104 demodulates the received signal and forwards the signal to the divider 105. Since the signal demodulated by the demodulator 104 is configured with the information signal transmitted from the radio station 200 to the radio station 100 and a control signal that contains information regarding the radio signal received at the antenna 201, the signal is forwarded to the divider 105 so as to divide the signal into the information signal and the control signal. The control signal is then forwarded to the frequency band controller 109. Further, the radio signal data measurer 107 measures the frequency and the reception power level of the radio signal received at the antenna 101. The notification signal measurer 106 measures the reception power level of the notification signal in the frequency band for control, which is received at the antenna 101, and forwards the measured data that indicates the reception power level to the frequency band controller 109.

The CIR calculator 115 calculates interference included in the radio signal based on the radio signal retrieved from the receiver 103 and the signal of information signal retrieved from the demodulator 104, and forwards a value of CIR to the frequency band controller 109.

On the other hand, the multiplexer 114 multiplexes the information regarding the reception power level of the radio signal that is measured by the radio signal data measurer 107 and the information signal. The multiplexer 114 forwards the multiplexed signal to the TX rate determiner 110 and the modulator 113. The TX rate determiner 110 determines the transmission rate of the radio link to be set and forwards the determined rate to the frequency band controller 109.

The frequency band controller 109 controls a frequency band of a transmission radio link based on the information regarding the interference received at the radio station 200, the information of the notification signal measured at the notification signal measurer 106 and the transmission rate determined by the TX rate determiner 110. The modulator 113 then modulates the multiplexed signal to a radio signal according to the control of the frequency band controller 109 and forwards the modulated signal to the combiner 112.

Further, the frequency band controller 109 forwards the information regarding the frequency band assigned for the radio link from the radio station 200 to the radio station 100 to the notification signal generator 108. The notification signal generator 308 generates the notification signal corresponding to the received frequency band of the radio link based on the value of the CIR forwarded by the CIR calculator 115. The notification signal generator 108 then forwards the generated notification signal to the combiner 112. The combiner 112 combines the radio signal forwarded by the modulator 113 and the notification signal forwarded by the notification signal generator 108, and forwards the combined signal to the transmitter 111. The combined signal is then transmitted by the antenna 101 through the TX/RX splitter 102. It is to be noted that the same process is also performed in the radio station 200.

FIFTH EMBODIMENT

Figure 14:
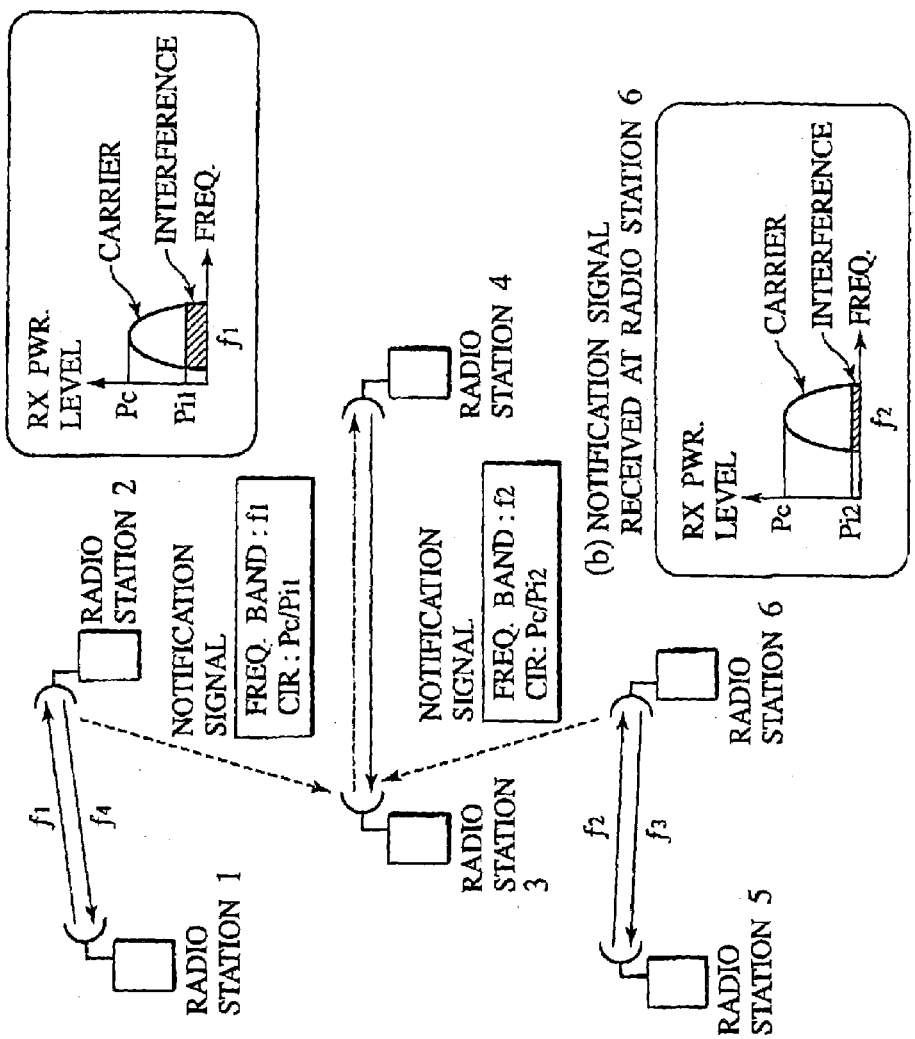
FIG. 14 is a schematic diagram showing an overview of a communication control system according to the fifth embodiment.

FIG. 14 is a schematic diagram showing an overview of a communication control system according to this embodiment. In FIG. 14, $f_1$ through $f_5$ indicate a frequency band on the traffic frequency band. Further, the frequency bands are assigned to radio links whereby bi-directional communications are being performed between the radio station 1 and the radio station 2, and between the radio station 5 and the radio station 6, respectively.

In this embodiment, a transmission side radio station modulates the notification signal that contains a value of the calculated CIR and transmits the signal, and a reception side radio station retrieves the value of CIR by demodulating the received notification signal.

Since the CIR at the radio stations 2 and 6 are $P_c/P_{i1}$ and $P_c/P_{i2}$, respectively, the radio stations modulate information containing the value of the CIR and the received frequency band, and transmit the modulated notification signal. Therefore, when a radio link is set at the radio station 3, the radio station 3 determines an assignable frequency band using a propagation loss that is calculated based on the reception power level of the modulated notification signal, the information of the received frequency band contained in the notification signal and the value of the CIR. Thus, the radio station 3 can select a frequency band, which avoids that which has transmission quality whereby the radio link degrades below a prescribed threshold.

Figure 15:
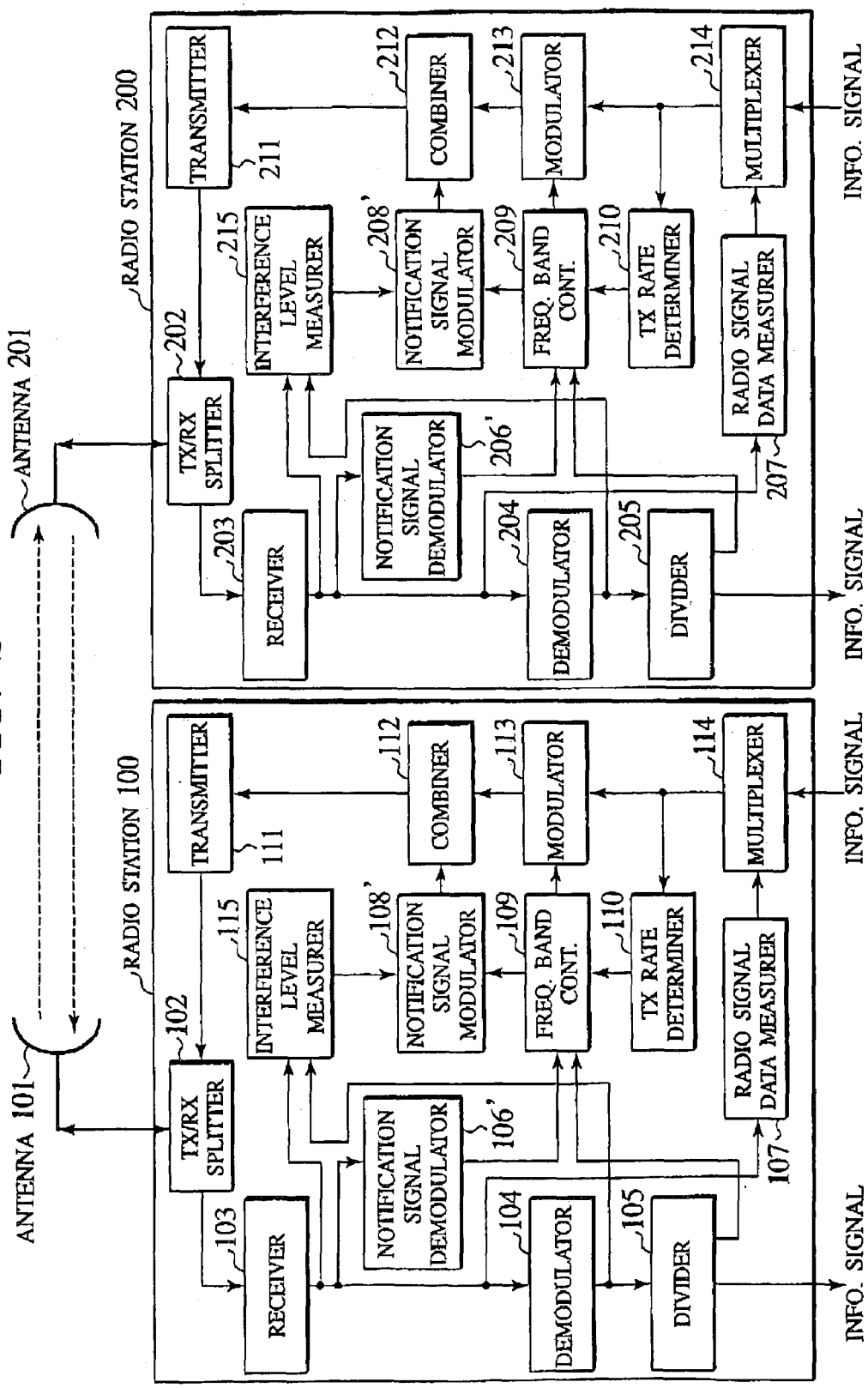
FIG. 15 is a block diagram showing radio stations according to the fifth embodiment.

FIG. 15 is a schematic diagram showing radio stations according to this embodiment. Especially, in this embodiment, each radio station modulates the information regarding the frequency band of the received radio links, and transmits the modulated notification signal. Further, the radio station has a notification signal demodulator 106' which demodulates the notification signal so as to acquire the information regarding the frequency band, a CIR calculator 115 which calculates the value of CIR, and a notification signal modulator 108' which modulates the notification signal according to the value of CIR.

The radio station 100 receives the radio signal from the radio station 200 via the antenna 101, and the receiver 103 receives the radio signal through the TX/RX splitter 102. The demodulator 104 demodulates the received signal and forwards the signal to the divider 105.

Since the signal demodulated by the demodulator 104 is configured with the information signal transmitted from the radio station 200 to the radio station 100 and a control signal that contains information regarding the radio signal received at the antenna 201, the signal is forwarded to the divider 105 so as to divide the signal into the information signal and the control signal.

The control signal is then forwarded to the frequency band controller 109. Further, the radio signal data measurer 107 measures the frequency and the reception power level of the radio signal received at the antenna 101. The notification signal demodulator 106' demodulates the notification signal, which is received at the antenna 101. Further, notification signal demodulator 106' acquires the information regarding the received frequency band and the value of CIR, and measures the reception power level of the notification signal. The information regarding the reception frequency band as well as the value of CIR and the measured reception power level are then forwarded to the frequency band controller 109.

The CIR calculator 115 calculates the interference included in the radio signal based on the radio signal retrieved from the receiver 103 and the information signal retrieved form the demodulator 104, and forwards the value of CIR to the frequency band controller 109.

On the other hand, the multiplexer 114 multiplexes the information regarding the reception power level of the radio signal that is measured by the radio signal data measurer 107 and the information signal. The multiplexer 114 forwards the multiplexed signal to the TX rate determiner 110 and the modulator 113. The TX rate determiner 110 determines a transmission rate for the radio link to be set and forwards the determined rate to the frequency band controller 109.

The frequency band controller 109 controls a frequency band of the transmission radio link based on the information regarding the interference received at the radio station 200, the information of the notification signal measured at the notification signal demodulator 106' and the transmission rate determined by the TX rate determiner 110. The modulator 113 then modulates the multiplexed signal to a radio signal according to the control of the frequency band controller 109 and forwards the modulated signal to the combiner 112.

Further, the frequency band controller 109 forwards the information regarding the frequency band assigned for the radio link from the radio station 200 to the radio station 100 to the notification signal modulator 108'. The notification signal modulator 108' generates the notification signal that contains the value of CIR forwarded by the CIR calculator 115 and the information regarding the reception frequency band of the radio link, and modulates the notification signal. The notification signal modulator 108' then forwards the modulated notification signal to the combiner 112. The combiner 112 combines the radio signal forwarded by the modulator 113 and the notification signal forwarded by the notification signal modulator 108', and forwards the combined signal to the transmitter 111. The combined signal is then transmitted by the antenna 101 through the TX/RX splitter 102. It is to be noted that the same process is also performed in the radio station 200.

Modifications

The present invention is not limited to the first through fifth embodiments described above and the following modifications can be made.

(First Modification)

Figure 16:
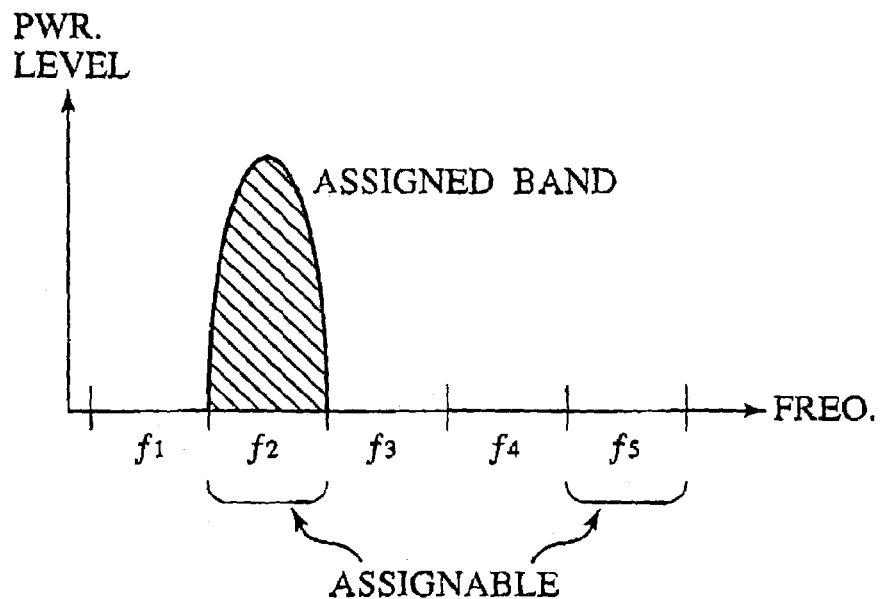
FIG. 16 is a schematic diagram showing assigned frequencies according to the first modification.

FIG. 16 is a schematic diagram showing assigned frequencies according to this modification. In this modification, if frequency bands $f_2$ and $f_5$ are determined as assignable, the frequency band $f_2$, of which the frequency is lower than $f_5$, is assigned to a radio link using an appropriate embodiment as described above.

Since assigning a frequency band, of which the frequency is as low as possible, to a radio link allows the effective use of frequencies, the total required frequency bandwidth is thus reduced.

(Second Modification)

Figure 17:
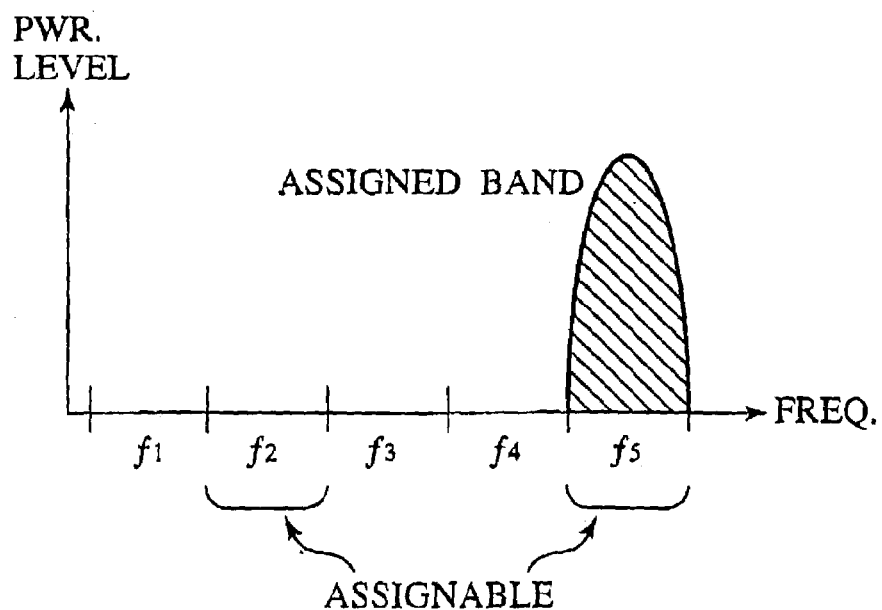
FIG. 17 is a schematic diagram showing assigned frequencies according to the second modification.

FIG. 17 is a schematic diagram showing assigned frequencies according to this modification. In this modification, if frequency bands $f_2$ and $f_5$ are determined as assignable, the frequency band $f_5$, of which the frequency is higher than $f_2$, is assigned to a radio link using an appropriate embodiment as described above.

Since assigning a frequency band, of which the frequency is as high as possible, to a radio link allows the effective use of frequencies, the total required frequency is bandwidth is thus reduced.

(Third Modification)

Figure 18:
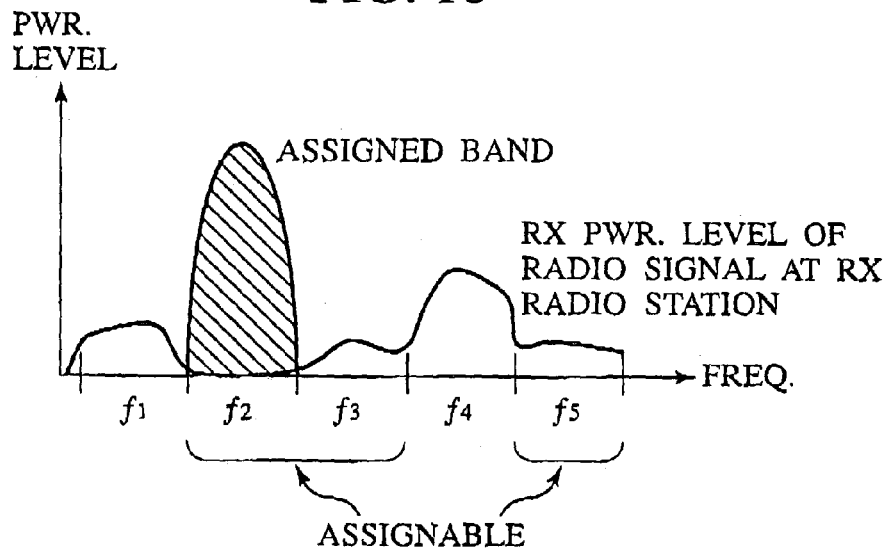
FIG. 18 is a schematic diagram showing assigned frequencies according to the third modification.

FIG. 18 is a schematic diagram showing assigned frequencies according to this modification. In this modification, if frequency bands $f_2$, $f_3$ and $f_5$ are determined as assignable, the frequency band $f_2$, of which the reception level at a reception side radio station is lowest, is assigned to a radio link.

This method reduces a situation where the level of interference power exceeds a prescribed threshold even if the condition of the interference varies, i.e., the level of the interference increases during communication.

(Fourth Modification)

Figure 19:
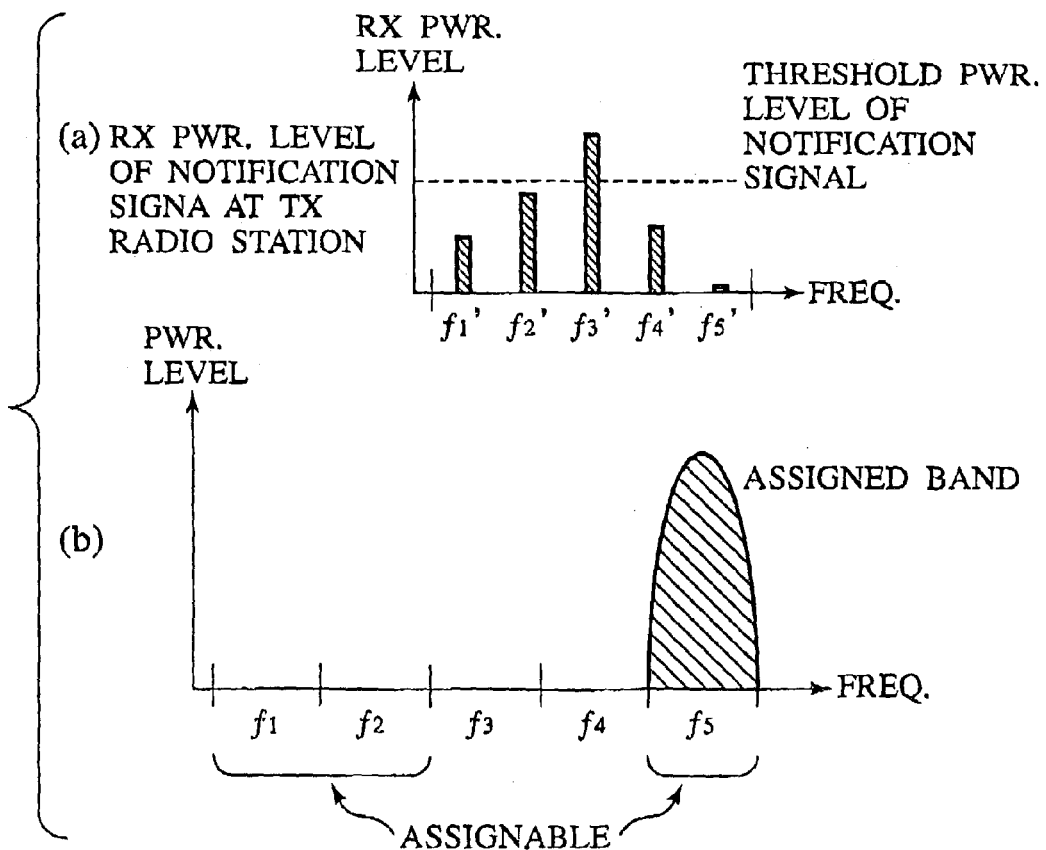
FIG. 19 is a schematic diagram showing assigned frequencies according to the fourth modification.

FIG. 19 is a schematic diagram showing assigned frequencies according to this modification. In this modification, if frequency bands $f_2$, $f_3$ and $f_5$ are determined as assignable, the frequency band $f_5$ is assigned to a radio link because the reception power level of the corresponding notification signal on the frequency band for control is lowest.

Since interference that may affect other radio links can be minimized by assigning a frequency band, of which the notification signal has lower reception power level, to the radio link, this method reduces a situation whereby a radio link degrades below the prescribed transmission quality due to interference caused by assigning other radio links.

(Fifth Modification)

Figure 20:
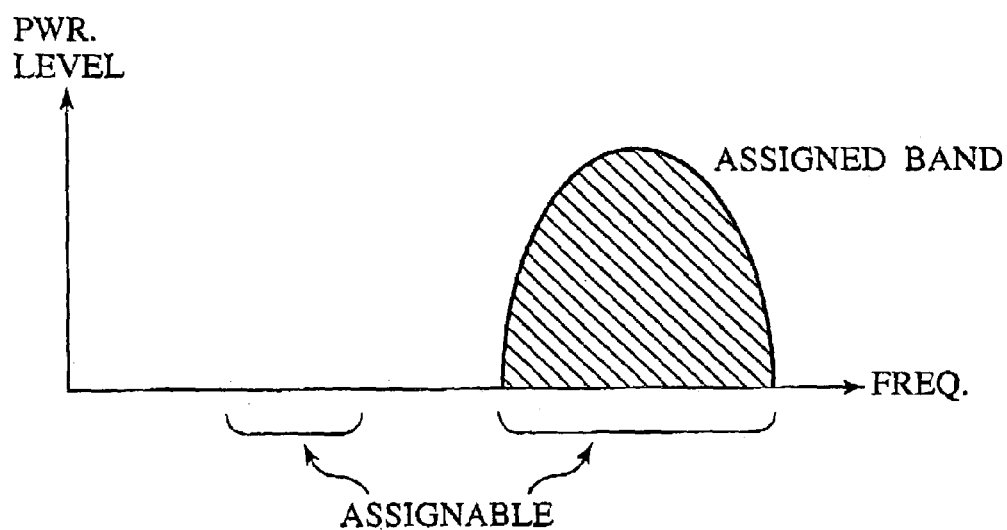
FIG. 20 is a schematic diagram showing assigned frequencies according to the fifth modification.

FIG. 20 is a schematic diagram showing assigned frequencies according to this modification. In this modification, as shown in FIG. 20, a frequency band is assigned according to the volume of data to be transmitted in an assignable bandwidth.

Figure 21:
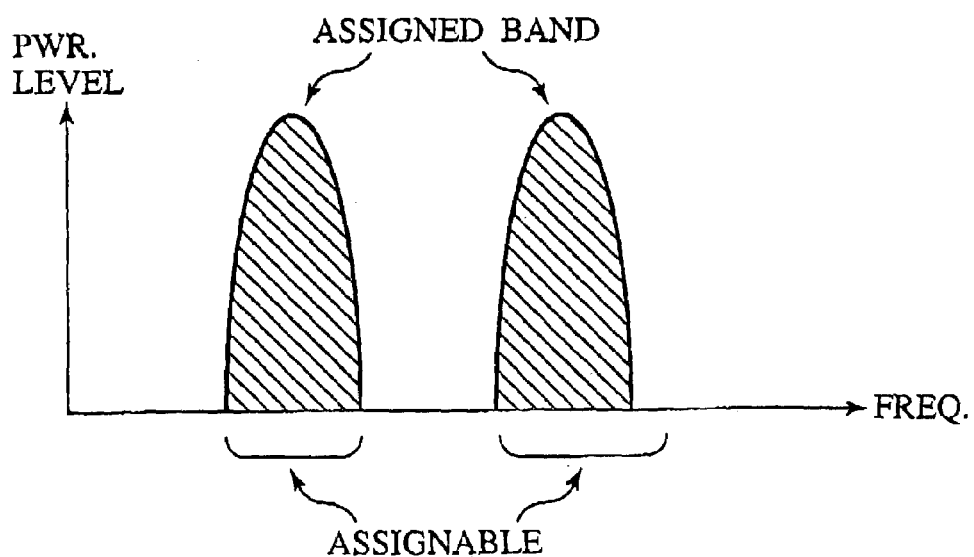
FIG. 21 is a schematic diagram showing assigned frequencies according to the fifth modification.

Further, as shown in FIG. 21, a couple of frequency bands may be assigned according to the volume of data to be transmitted as required. This method allows the effective use of frequencies even if a large volume of data is to be transmitted.

(Sixth Modification)

Incidentally, although a case where the radio station acts as a radio base station is described in the above embodiments, the radio station may also act as a mobile station as well.

Effects of Present Invention

As will be seen from the foregoing description, in the present invention, a notification signal which correlates with a reception frequency band is transmitted and the reception power level of the notification signal is measured at a transmission side radio station when radio communication is conducted between the transmission side radio station and a reception side radio station in a radio network in which a plurality of radio stations are deployed. Thus, the present invention prevents a frequency band that may greatly interfere with other radio links from being assigned, and an appropriate bandwidth can be assigned to respective radio links according to the volume of data to be transmitted.

The invention has been described in detail by referring to the embodiments. It is obvious to those skilled in the art that the invention is not restricted to the embodiments mentioned above. The invention may be carried out as a corrected or modified embodiment not departing from the gist and scope specified by the scope of the claims of the patent. Therefore, the description of this specification aims at the representation of examples but does not have any limitation on the present invention,

What is claimed is:

1. A communication control method for conducting communication between a transmission side radio station and a reception side radio station in a radio network in which a plurality of the radio stations are deployed, comprising the steps of:

(1) transmitting a notification signal that notifies information of a frequency of a radio link being used at each radio station;

(2) measuring a reception power level of a radio signal received and detecting a frequency of each radio signal at the reception side radio station;

(3) transmitting the reception power level and the detected frequency of the radio signal from the reception side radio station to the transmission side radio station;

(4) measuring a reception power level of each of the notification signals and detecting the frequency of the radio link being used at each of the radio stations, which is notified by the notification signal, at the transmission side radio station;

(5) determining an assignable frequency band to be used between the transmission side radio station and the reception side radio station at the transmission side radio station based on the reception power level and the detected frequency of the radio signal, the reception power level of the notification signal and information contained in the notification signal, (6) notifying information of an assigned frequency band from the transmission side radio station to the reception side radio station based on a result of the determination; and (7) transmitting a new notification signal correlating with the assigned frequency band at the reception side radio station according to the information of the assigned frequency band.

2. A communication control method according to claim 1, wherein the radio link is configured with a traffic frequency band that is used for transmission of an information signal and a frequency band for control that is used for a control signal, the frequency of the radio link being used at the radio station at a step (1) is located in the traffic frequency band , and the notification signal is transmitted using the frequency band for control.

3. A communication control method according to claim 2, wherein a frequency of the traffic frequency band correlates with a frequency of the frequency band for control, and each of the radio stations detects the frequency of the notification signal in the frequency band for control to recognize the frequency being used in the traffic frequency band at the radio station that transmits the notification signal.

4. A communication control method according to claim 2, wherein each of the radio stations modulates the notification signal that contains information of the frequency being used in the traffic frequency band and transmits the modulated notification signal, and other radio stations demodulate the modulated notification signal to acquire the information of the frequency being used in the traffic frequency band.

5. A communication control method according to claim 1, wherein each of the radio stations measures a carrier to interference ratio of the radio link being used, modulates the notification signal which has a power level corresponding to the measured carrier to interference ratio and transmits the modulated notification signal, and other radio stations receive and demodulate the modulated notification signal to acquire the measured carrier to interference ratio.

6. A communication control method according to claim 1, wherein the transmission side radio station determines a transmission rate based on a volume of data to be transmitted and assigns a required frequency bandwidth to transmit the data by the determined transmission rate.

7. A communication control system for conducting communication between a transmission side radio station and a reception side radio station in a radio network in which a plurality of the radio stations are deployed, comprising:

a notification signal transmitter configured to transmit a notification signal that notifies information of a frequency of a radio link being used at each radio station;

a notification signal measurer configured to measure a reception power level of a notification signal and to detect a frequency notified by the notification signal;

a radio signal data transmitter configured to transmit a reception power level and a frequency of the radio signal received at the reception side radio station;

a frequency band determiner configured to determine an assignable frequency band to be used between the transmission side radio station and the reception side radio station based the reception power level and the frequency of the radio signal, the reception power level of the notification signal and information contained in the notification signal; and a notification unit configured to notify the reception side radio station of information of an assigned frequency band based on a result of the determination by the frequency band determiner.

8. A communication control system according to claim 7, wherein the radio link is configured with a traffic frequency band that is used for transmission of an information signal and a frequency band for control that is used for a control signal, the frequency of the radio link being used at the radio station is located in the traffic frequency band, and the notification signal transmitter transmits the notification signal using the frequency band for control.

9. A communication control system according to claim 8, wherein a frequency of the traffic frequency band correlates with a frequency of the frequency band for control, and the notification signal measurer detects the frequency of the notification signal in the frequency band for control to recognize the frequency being used in the traffic frequency band at the radio station that transmits the notification signal.

10. A communication control system according to claim 8, further comprising:

a notification signal modulator configured to modulate the notification signal that contains information of the frequency being used in the traffic frequency band and transmit the modulated notification signal, and a notification signal demodulator configured to demodulate the modulated notification signal to acquire the information of the frequency being used in the traffic frequency band.

11. A communication control system according to claim 10, wherein the notification signal modulator modulates the notification signal that contains the measured carrier to interference ratio and transmits the modulated notification signal, and the notification signal demodulator demodulates the modulated notification signal to acquire the measured carrier to interference ratio.

12. A communication control system according to claim 7, wherein the notification signal transmitter transmits the notification signal at a random interval within a prescribed time range.

13. A communication control system according to claim 7, wherein the notification signal transmitter measures a carrier to interference ratio of the radio link being used and transmits the notification signal with a power level that corresponds to the measured carrier to interference ratio.

14. A communication control system according to claim 7, further comprising:

a transmission rate determiner configured to determine a transmission rate based on a volume of data to be transmitted, and a frequency band controller configured to assign a required frequency bandwidth to transmit the data by the determined transmission rate.

15. A communication control system according to claim 7, wherein priority is given to a lower frequency in the assignable frequency band when a frequency is assigned to the radio link by the frequency band determiner.

16. A communication control system according to claim 7, wherein priority is given to a higher frequency in the assignable frequency band when a frequency is assigned to the radio link by the frequency band determiner.

17. A communication control system according to claim 7, wherein the frequency band determiner assigns frequency bands that are contiguously located in the traffic frequency band to radio links.

18. A communication control system according to claim 7, wherein the frequency band determiner assigns a plurality of frequency bands to a radio link.

* * * * *